(12) United States Patent
Takahashi et al.

(10) Patent No.: US 7,519,292 B2
(45) Date of Patent: Apr. 14, 2009

(54) CAMERA APPARATUS

(75) Inventors: Nobutatsu Takahashi, Tokyo (JP);
Seiya Amatatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 11/268,238

(22) Filed: Nov. 7, 2005

(65) Prior Publication Data

US 2006/0098976 A1 May 11, 2006

(30) Foreign Application Priority Data

Nov. 8, 2004 (JP) .............................. 2004-324173
Nov. 17, 2004 (JP) .............................. 2004-333643

(51) Int. Cl.
*G03B 17/02* (2006.01)
*H04N 5/00* (2006.01)

(52) U.S. Cl. ........................ 396/535; 348/375; 386/118; 386/125

(58) Field of Classification Search ................. 396/535, 396/423–425, 439, 25, 29; 386/117, 125, 386/E5.072, 118, 126; 720/650, 657; 369/44.29, 369/53.22; 348/207.99, 373, 81; 206/316.2, 206/811
See application file for complete search history.

(56) References Cited

U.S. PATENT DOCUMENTS 5,946,512 A * 8/1999 Lavine et al. ............... 396/423

| 6,404,981 | B1 * | 6/2002 | Kumagai et al. | ............ 386/125 |
| 6,567,611 | B1 | 5/2003 | Soga | |
| 2004/0126099 | A1 * | 7/2004 | Mori et al. | .................. 386/117 |
| 2005/0084252 | A1 * | 4/2005 | Satou et al. | ................. 386/126 |
| 2005/0147397 | A1 * | 7/2005 | Isawa et al. | ................. 386/117 |

FOREIGN PATENT DOCUMENTS

| CA | 2 303 525 | 9/2001 |
| EP | 0 541 449 | 5/1993 |
| EP | 0 766 459 | 4/1997 |
| JP | 10 133816 | 5/1998 |
| JP | 2002 229672 | 8/2002 |
| JP | 2004 280432 | 10/2004 |

* cited by examiner

*Primary Examiner*—William B. Perkey
(74) *Attorney, Agent, or Firm*—Frommer Lawrence & Haug LLP; William S. Frommer; Thomas F. Presson

(57) ABSTRACT

A camera apparatus comprising a disc compartment portion in which a DVD-R is accommodated so as to be loaded and unloaded, a disc rotating apparatus provided within the disc compartment portion and rotating the DVD-R which can be detachably loaded thereon, a lens apparatus for passing light from an object, a CCD for forming an image from light passed through the lens apparatus and outputting an image signal corresponding to the image, an optical pickup apparatus capable of recording image information on the DVD-R based on the image signal outputted from the CCD and a radiation plate provided within the disc compartment portion. The radiation plate and the CCD are constructed so as to transmit heat therebetween so that heat can be radiated from the CCD through the radiation plate to the disc compartment portion.

5 Claims, 17 Drawing Sheets

CAMERA APPARATUS

CROSS REFERENCES TO RELATED APPLICATIONS

The present invention contains subject matter related to Japanese Patent Application JP 2004-324173 filed in the Japanese Patent Office on Nov. 8, 2004 and Japanese Patent Application JP 2004-333643 filed in the Japanese Patent Office on Nov. 17, 2004 the entire contents of which being incorporated herein by reference.

BACKGROUND OF THE INVENTION

1. Field of the Invention

The present invention relates to a camera apparatus using a disc-like recording medium as an information recording medium, and particularly to a camera apparatus in which a mechanical deck supporting thereon a disc rotating means is formed as substantially a D-like shape and in which a lens apparatus is located at the mechanical deck at its portion without an arc.

2. Description of the Related Art

Cited Patent Reference 1, for example, has described so far a camera apparatus according to the related art. The Cited Patent Reference 1 has described a still video camera using a hard disk apparatus of a suitable system, such as a magnetic recording system, as a recording medium to record and reproduce shooting information.

The still video camera described in this Cited Patent Reference 1 includes a camera body composed of a solid-state image pickup device for converting shot information obtained through a lens into an electric video signal and an analog-to-digital (A/D) converter for converting a video signal read out from the solid-state image pickup device into a digital video signal wherein the output from the A/D converter is recorded on a recording medium. In this still video camera, the above-described recording medium is composed of a hard disk built-in the above-described camera body and a motor shaft for rotating the hard disk is placed in parallel to the optical axis of the above-described lens.

According to the still video camera having the above arrangement, there can be expected effects in which relatively inexpensive and high-density digital video recording which is excellent in mobility becomes possible and in which bad influences, such as vibration and shock, imposed on the HDD (hard disk drive) built-in the camera body can be reduced so that excellent pictures can be recorded and reproduced.

Cited Patent Reference 2, for example, has described so far another example of this kind of a camera apparatus according to the related art. The Cited Patent Reference 2 has described a recording and reproducing apparatus having a built-in camera for recording or reproducing video information on a disc-like recording and reproducing medium such as a digital video disc.

The recording and reproducing apparatus having a built-in camera described in the Cited Patent Reference 2 is composed of a camera unit including an image pickup device for converting image information such as still picture and/or moving picture into an electric signal, a disc-like recording medium, a drive means for holding and rotating the above-described recording medium at a predetermined speed, a recording and reproducing head unit for converting the above-described electric signal into a recording signal, recording the recording signal on the above-described recording medium spirally in a non-contact fashion, reproducing recorded information from the above-described recording medium and converting reproduced information into a reproduced signal, a control circuit unit for controlling the camera unit, the driving means and the recording and reproducing head unit and a display means for displaying the above-described recording signal or reproducing signal as image information.

According to the recording and reproducing apparatus having a built-in camera having the above-mentioned arrangement, there can be expected effects in which a convenient and stable recording and reproducing apparatus having a built-in camera can be provided by a simple arrangement so that the apparatus can be made inexpensive and small in size.

However, in the camera apparatus on the above-mentioned Cited Patent Reference 1, the lens apparatus and the hard disk drive (HDD) are overlapping each other in the front and back direction and the motor shaft for rotating the magnetic disc is located in parallel to the optical axis of the lens of the lens apparatus. Therefore, there is a problem in which the camera body is increased in length in the depth direction so that the whole of the apparatus becomes large in size unavoidably.

Also, in the camera apparatus on the above-mentioned Cited Patent Reference 2, the camera unit is located in parallel to the outside of the main body in which the recording and reproducing apparatus is accommodated and the optical axis of the lens of the camera unit is set to be the outside of the outer peripheral edge of the disc loaded on the recording and reproducing apparatus. Therefore, there is a problem in which the camera body is increased in length in the lateral direction so that the whole of the apparatus becomes large in size similarly.

Cited Patent Reference 1: Official Gazette of Japanese laid-open patent application No. 6-90426

Cited Patent Reference 2: Official Gazette of Japanese laid-open patent application No. 9-320170

As described above, in the camera apparatus of this kind according to the related art, since the lens apparatus is located on substantially the same axis relative to the disc drive apparatus in an overlapping fashion and it is located distant from the disc drive apparatus with a large distance kin the lateral direction, in either case, the whole of the camera apparatus becomes large in size and hence it is not possible to make the whole of the camera apparatus small in size.

SUMMARY OF THE INVENTION

In view of the aforesaid aspects, the present invention intends to provide a camera apparatus whose reliability in operation can be improved.

The present invention intends to provide a camera apparatus which can be reduced in thickness and which can be made compact in size.

Further, the present invention intends to provide a camera apparatus in which image quality can be prevented from being deteriorated.

Furthermore, the present invention intends to provide a camera apparatus in which an image pickup device can be protected from being warped and deformed.

According to an aspect of the present invention, there is provided a camera apparatus which is comprised of a disc compartment portion into and from which a disc-like recording medium can be loaded and unloaded, a disc rotating means provided within the disc compartment portion and rotating the disc-like recording medium which can be detachably loaded thereon, a lens apparatus for passing light from an object, an image pickup device for forming an image from light supplied thereto from the lens apparatus and outputting an image signal corresponding to the image, a recording means capable of recording image information on the disc-like recording medium based on the image signal outputted from the image pickup device and a radiation plate provided within the disc compartment portion, wherein the radiation plate and the image pickup device are constructed so as to transmit heat therebetween so that heat can be transmitted from the image pickup device through the radiation plate to the disc compartment portion.

In the camera apparatus according to the present application, the disc compartment portion has located therein a mechanical deck to which the disc rotating means is attached, the mechanical deck is formed as substantially a D-like shape and the mechanical deck has located at its portion without an arc the lens apparatus in such a manner that an optical axis of a lens thereof is extended in the direction substantially parallel to the axial direction of a rotary shaft of the disc rotating means.

In the camera apparatus according to the present application, the disc-like recording medium loaded onto the disc rotating means has inside structures located within a projection surface.

In the camera apparatus according to the present application, the disc compartment portion has located therein a panel which covers the mechanical deck at its portion without an arc, the panel being a radiation plate with excellent heat transmission property.

In the camera apparatus according to the present invention, the radiation plate is located close to or in contact with the image pickup device.

Further, in the camera apparatus according to the present invention, the radiation plate and the image pickup device have a sheet member having elasticity and heat transmission property interposed therebetween.

Furthermore, in the camera apparatus according to the present application, the camera apparatus is further comprised of a camera apparatus body having the disc rotating means, the lens apparatus and the recording means housed therein, the mechanical deck being located so as to divide the inside of the camera apparatus body into two chambers.

According to the camera apparatus of the present application, in the camera apparatus including the disc compartment portion, the disc rotating means, the lens apparatus, the image pickup device, the recording apparatus and the radiation plate, since the image pickup device and the radiation plate are constructed so as to transmit heat therebetween so that heat is radiated from the image pickup device through the radiation plate to the disc compartment portion, heat radiation efficiency of the image pickup device can be improved, influence of heat can be decreased by controlling rise of temperature of the disc drive apparatus, devices located around the disc drive apparatus, assemblies and the like and hence operations of the camera apparatus can be made more reliable.

According to the camera apparatus of the present application, since the mechanical deck is formed as substantially the D-like shape and it is located in the disc compartment portion and the lens apparatus is located at the mechanical deck at its portion without the arc in such a manner that the optical axis of the lens is extended in substantially parallel to the axial direction of the rotary shaft of the disc rotating means, a space can be formed under the disc-like recording medium loaded onto the disc rotating means and the lens apparatus can be located within such space. Hence, the camera apparatus including the camera portion can be decreased in thickness and it can be reduced in size by effectively using the empty space.

According to the camera apparatus of the present application, since the inside structures of the camera apparatus are located within the projection surface of the disc-like recording medium loaded onto the disc rotating means, the camera apparatus can be decreased in thickness and it can be reduced in size and hence it is possible to provide a small camera apparatus which is what might be called a "disc size".

According to the camera apparatus of the present application, since the disc compartment portion has located therein the panel which covers the mechanical deck at its portion without the arc and the panel is formed of the radiation plate with excellent heat transmission property, a clearance around the mechanical deck can be filled with the radiation plate and hence the camera apparatus can be made attractive. Further, since the spindle motor, the image pickup device and assemblies located around the spindle motor and the image pickup device can be improved in heat radiation efficiency and influence of heat can be decreased by controlling rise of temperature of the camera apparatus, devices located around the camera apparatus, assemblies and the like and hence operations of the camera apparatus can be made more reliable.

According to the camera apparatus of the present application, since the radiation plate is located close to the image pickup device or the radiation plate is brought in contact with the image pickup device, the radiation plate can radiate heat from the image pickup device so that rise of temperature of the image pickup device can be controlled. Thus, it is possible to suppress temperature from being raised by heat generated from the image pickup device and hence it is possible to prevent deterioration of image quality due to rise of temperature such as white defect occurred on the light-receiving surface of the image pickup device.

Further, according to the camera apparatus of the present application, since the sheet member having elasticity and heat transmission property is interposed between the radiation plate and the image pickup device, it is possible to protect the image pickup device by suppressing the image pickup device from being warped and deformed due to urging external force.

Furthermore, according to the camera apparatus of the present application, since the mechanical deck is located so as to divide the inside of the camera apparatus body, in which the disc rotating means and the like are accommodated, into the two chambers, the empty within the camera apparatus body can be used effectively so that the camera apparatus including the camera portion can be decreased in thickness and reduced in size.

As described above, according to the present invention, heat radiation efficiency of the image pickup device can be improved, rise of temperature of the image pickup device, the devices, the assemblies and the like located around the image pickup device can be suppressed and heat influences imposed thereon can be decreased. Thus, it is possible to realize the camera apparatus whose reliability of operation can be improved by the simple structure.

DESCRIPTION OF THE PREFERRED EMBODIMENTS

The present invention will now be described below with reference to the accompanying drawings.

INVENTIVE EXAMPLE 1

Figure 1:
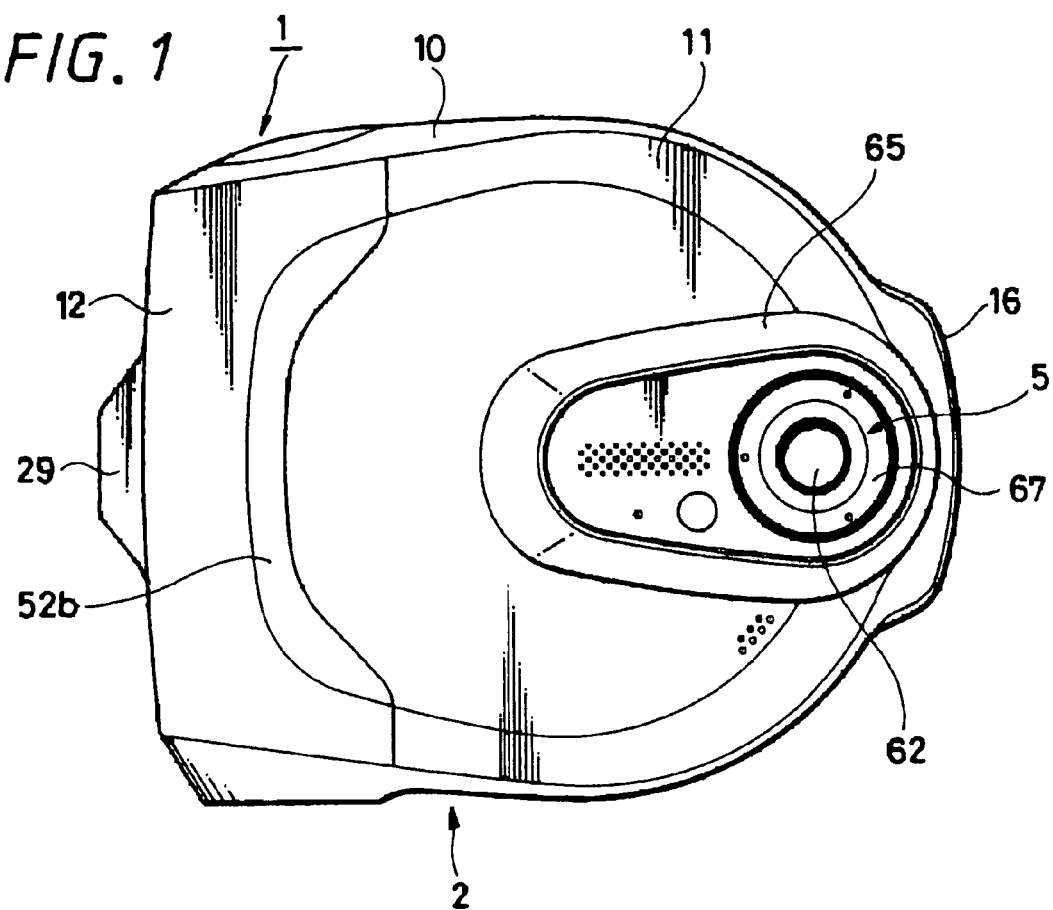
FIG. 1 is a front view showing a disc type camera apparatus of a camera apparatus according to a first embodiment of the present invention.
Figure 2:
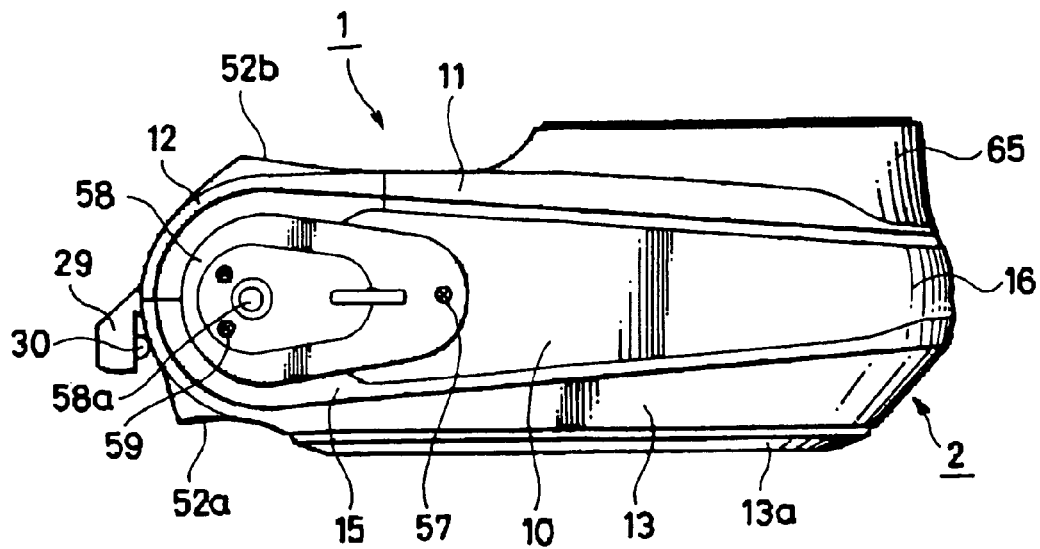
FIG. 2 is a bottom view of the disc type camera apparatus shown in FIG. 1.
Figure 3:
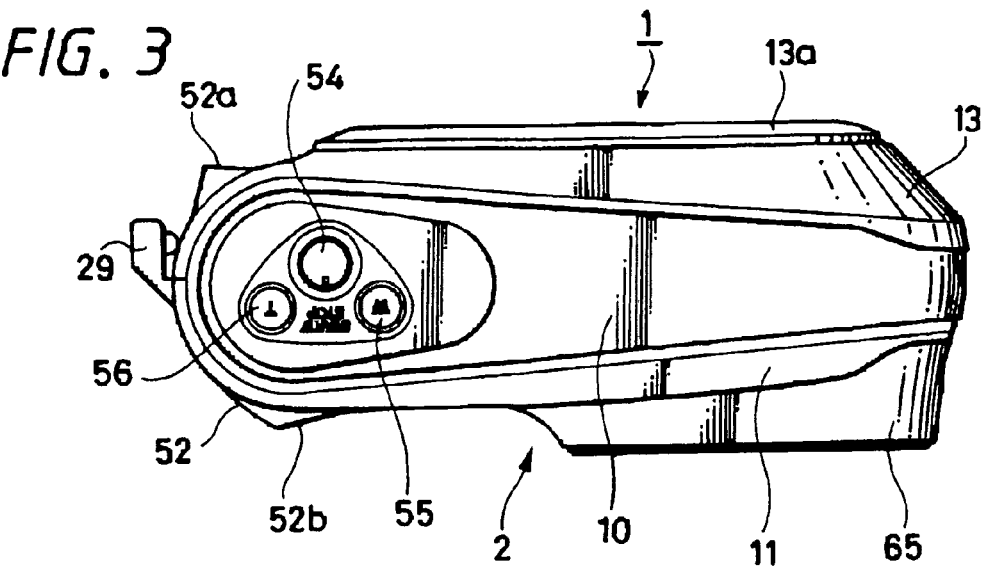
FIG. 3 is a plan view of the disc type camera apparatus shown in FIG. 1.
Figure 4:
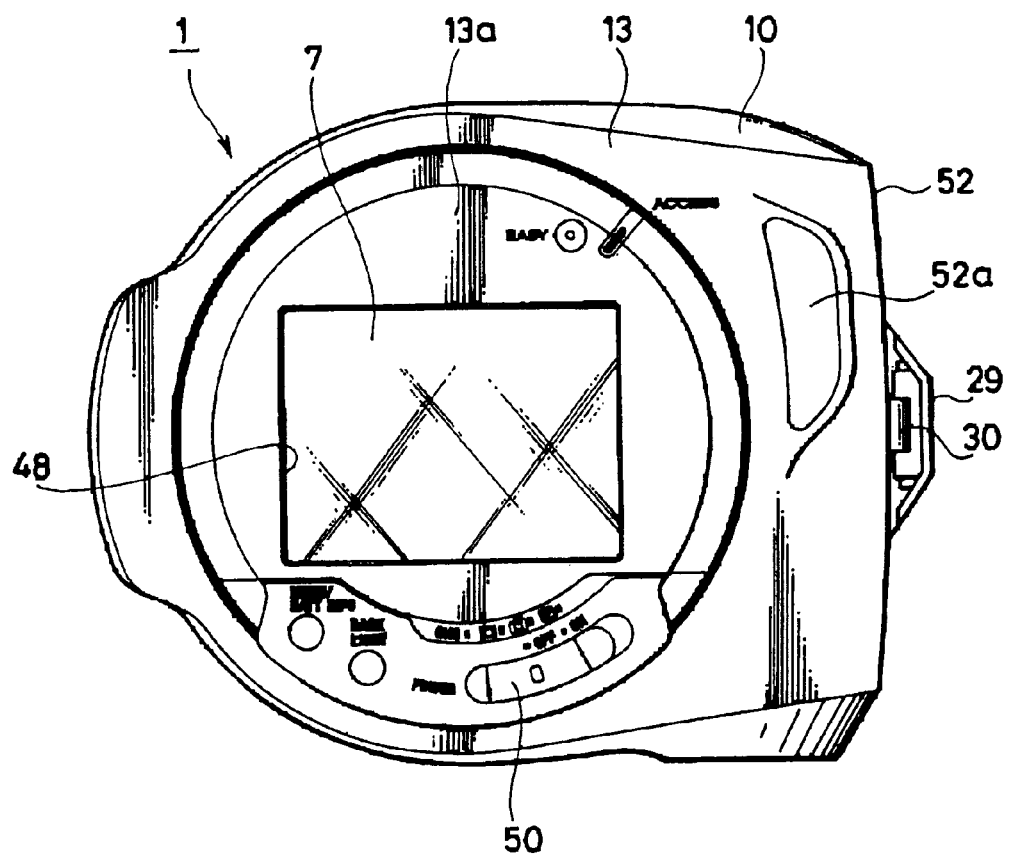
FIG. 4 is a rear view of the disc type camera apparatus shown in FIG. 1.
Figure 5:
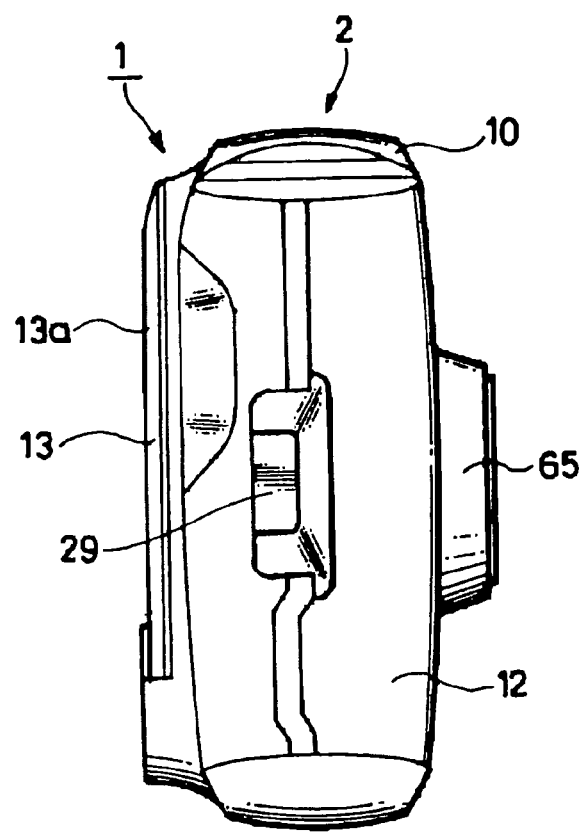
FIG. 5 is a left-hand side elevational view of the disc type camera apparatus shown in FIG. 1.
Figure 6:
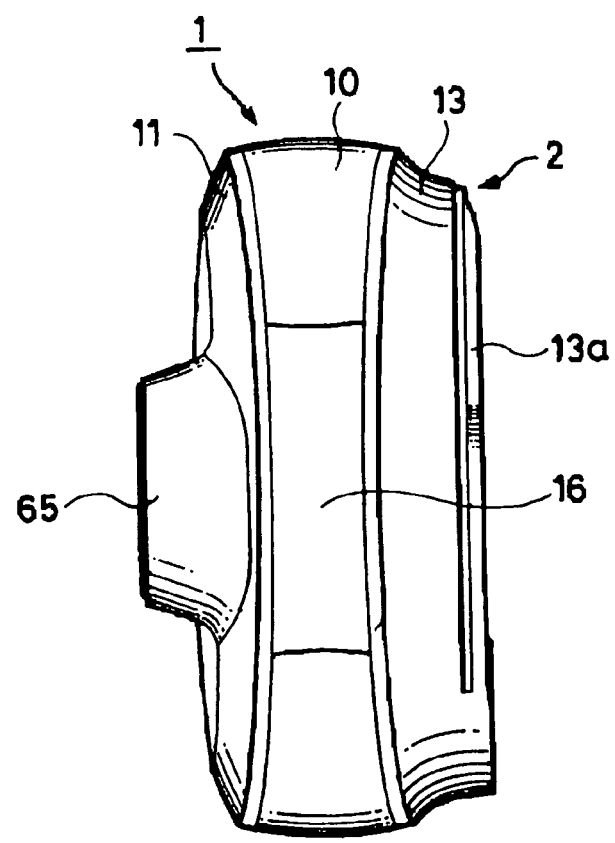
FIG. 6 is a right-hand side elevational view of the disc type camera apparatus shown in FIG. 1.
Figure 7:
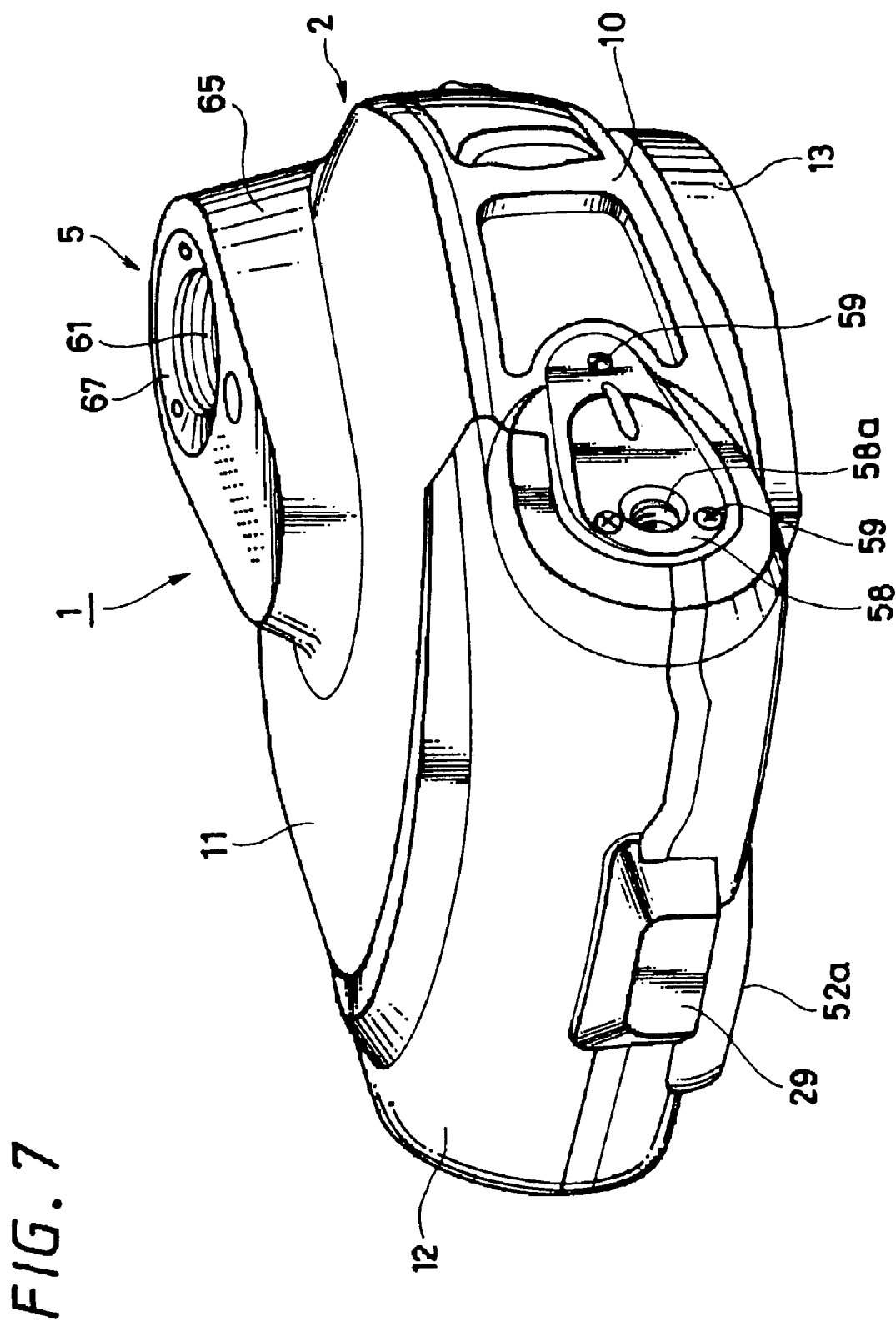
FIG. 7 is a perspective view of an outside appearance showing the disc type camera apparatus shown in FIG. 1 from the side of the lens-side outer case body.
Figure 8:
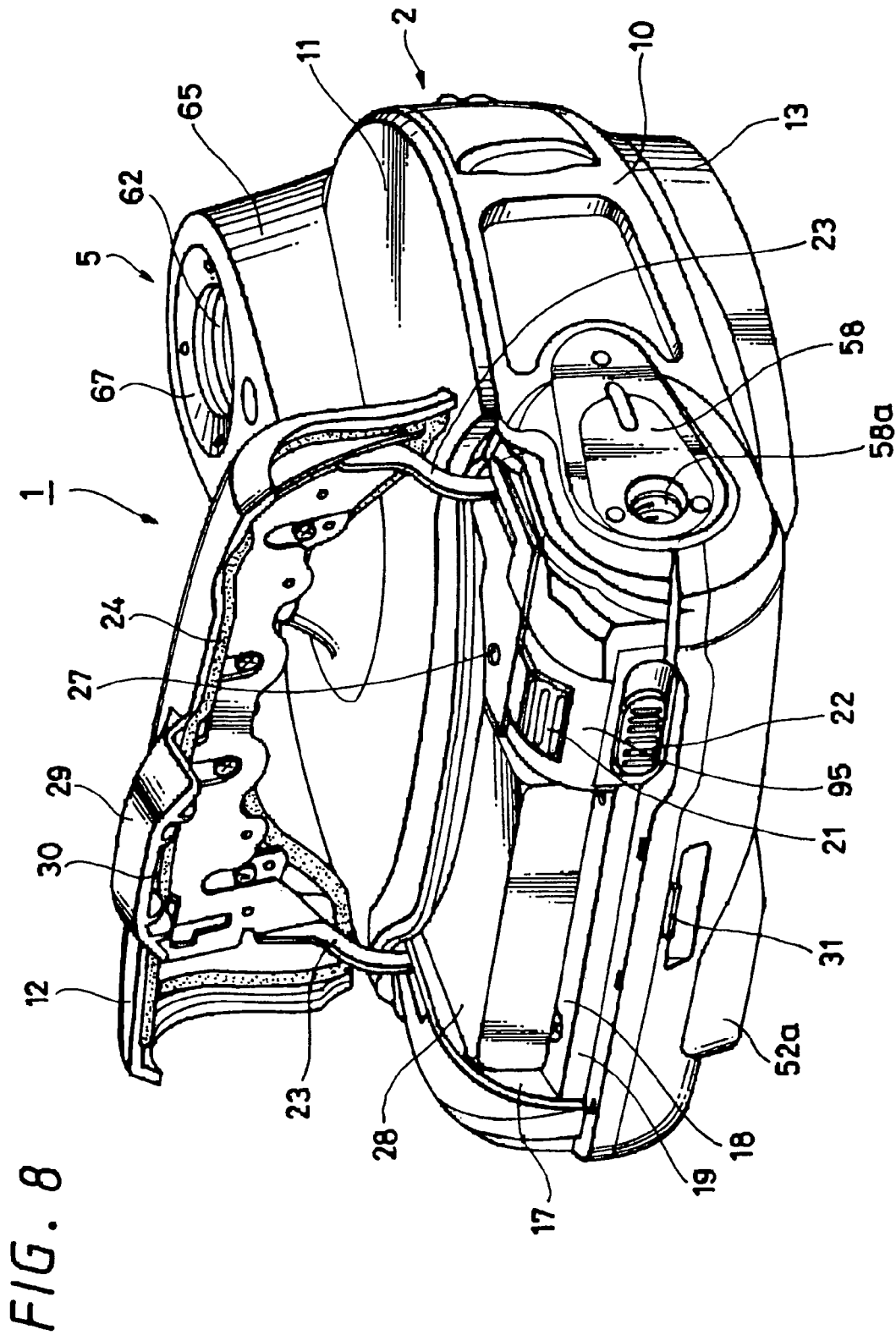
FIG. 8 is a perspective view of an outside appearance showing the disc type camera apparatus shown in FIG. 1 from the side of the lens-side outer case body with a buckle being opened.
Figure 9:
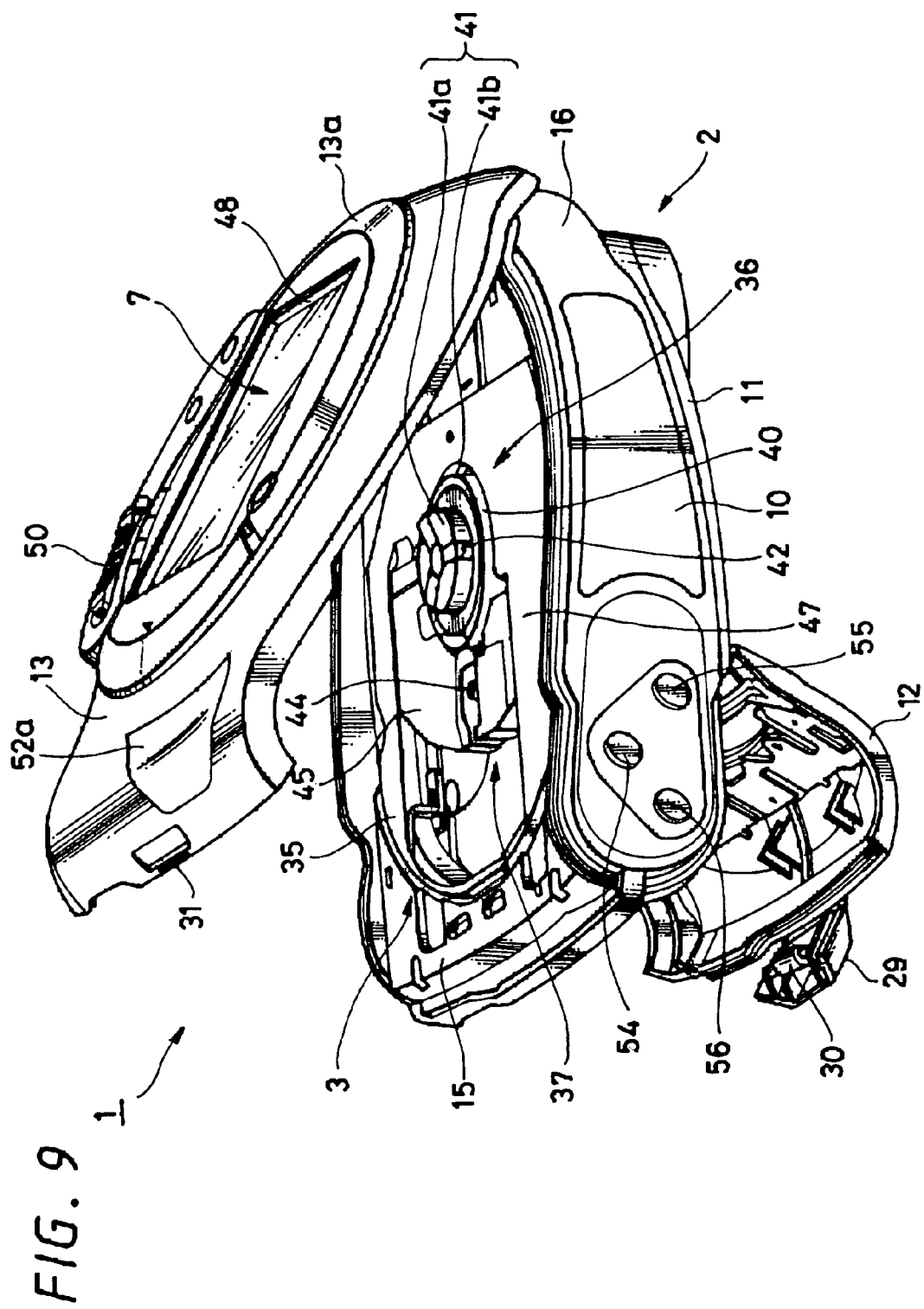
FIG. 9 is a perspective view showing the disc type camera apparatus shown in FIG. 1 from the side of a disc lid with the disc lid and the buckle being opened.
Figure 10:
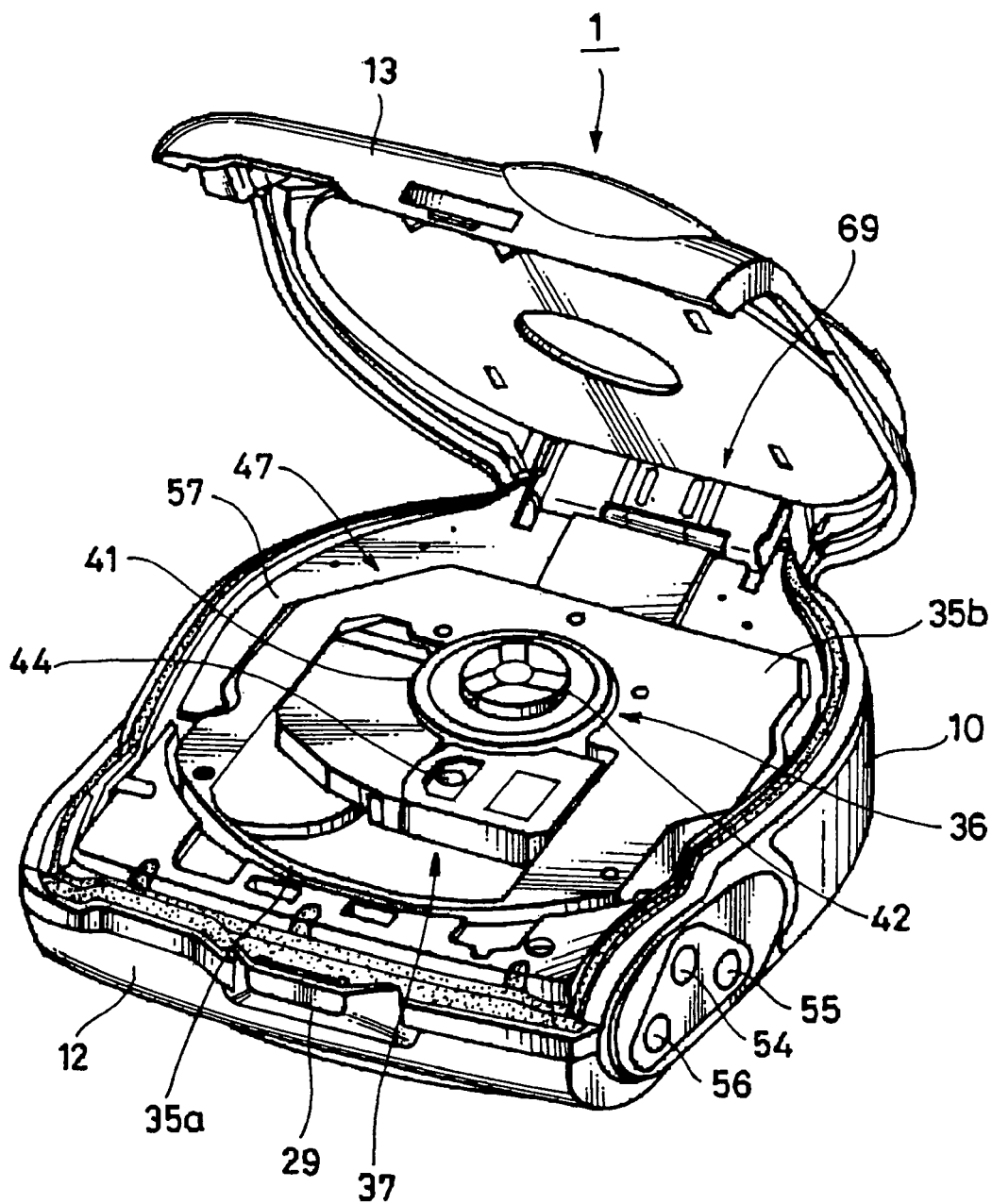
FIG. 10 is a perspective view showing a disc compartment portion of the disc type camera apparatus shown in FIG. 1 with the disc lid being opened.
Figure 11:
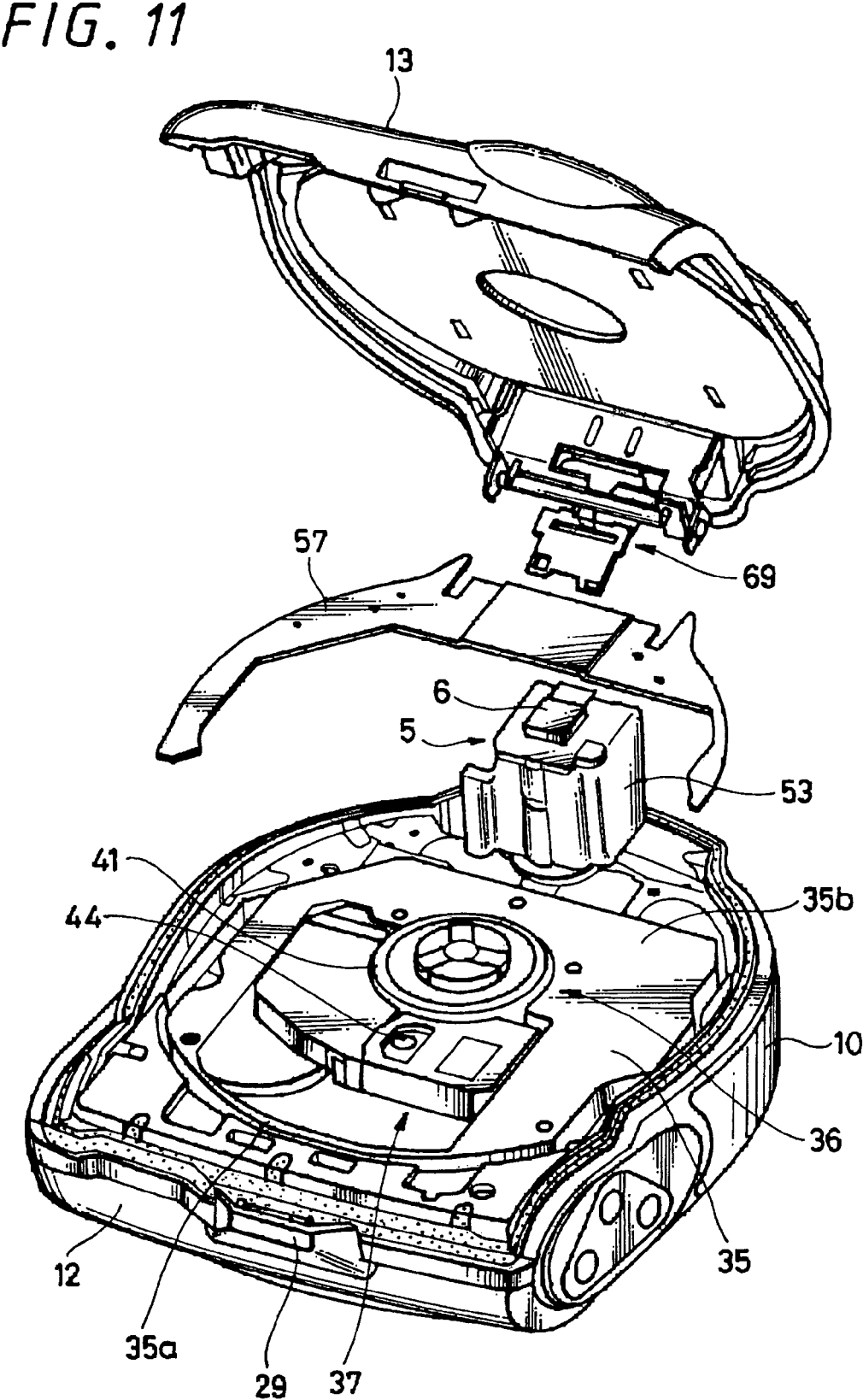
FIG. 11 is an exploded perspective view showing the disc lid, a panel and a lens apparatus of the disc type camera apparatus shown in FIG. 10.
Figure 12:
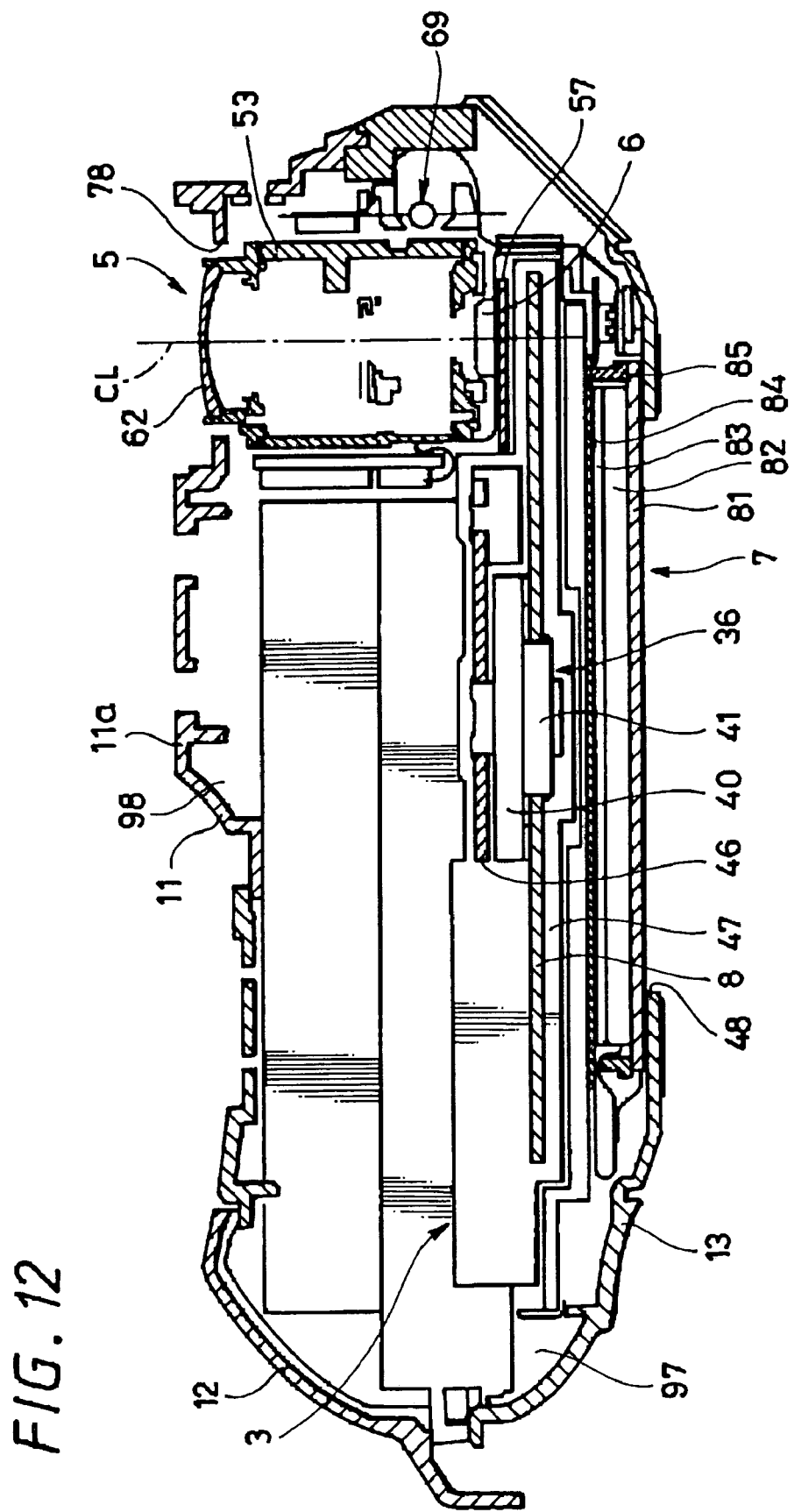
FIG. 12 is a cross-sectional view to which reference will be made in explaining schematic arrangements of inside structures of the disc type camera apparatus shown in FIG. 1.
Figure 13:
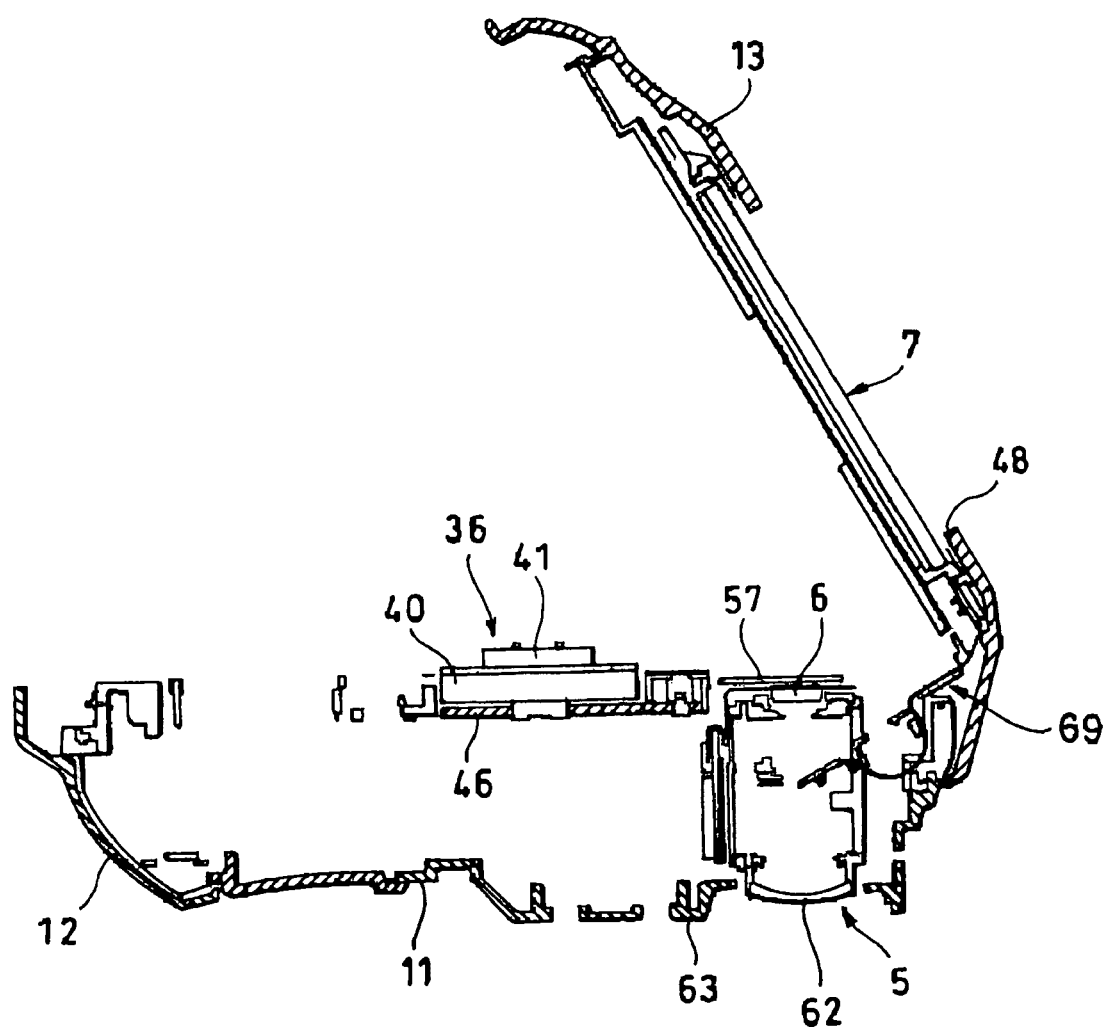
FIG. 13 is a cross-sectional view used to explain a positional relationship among the lens apparatus, the panel and the disc rotating apparatus with the disc lid being opened while the inside structures of the disc type camera apparatus shown in FIG. 1 are omitted.
Figure 14:
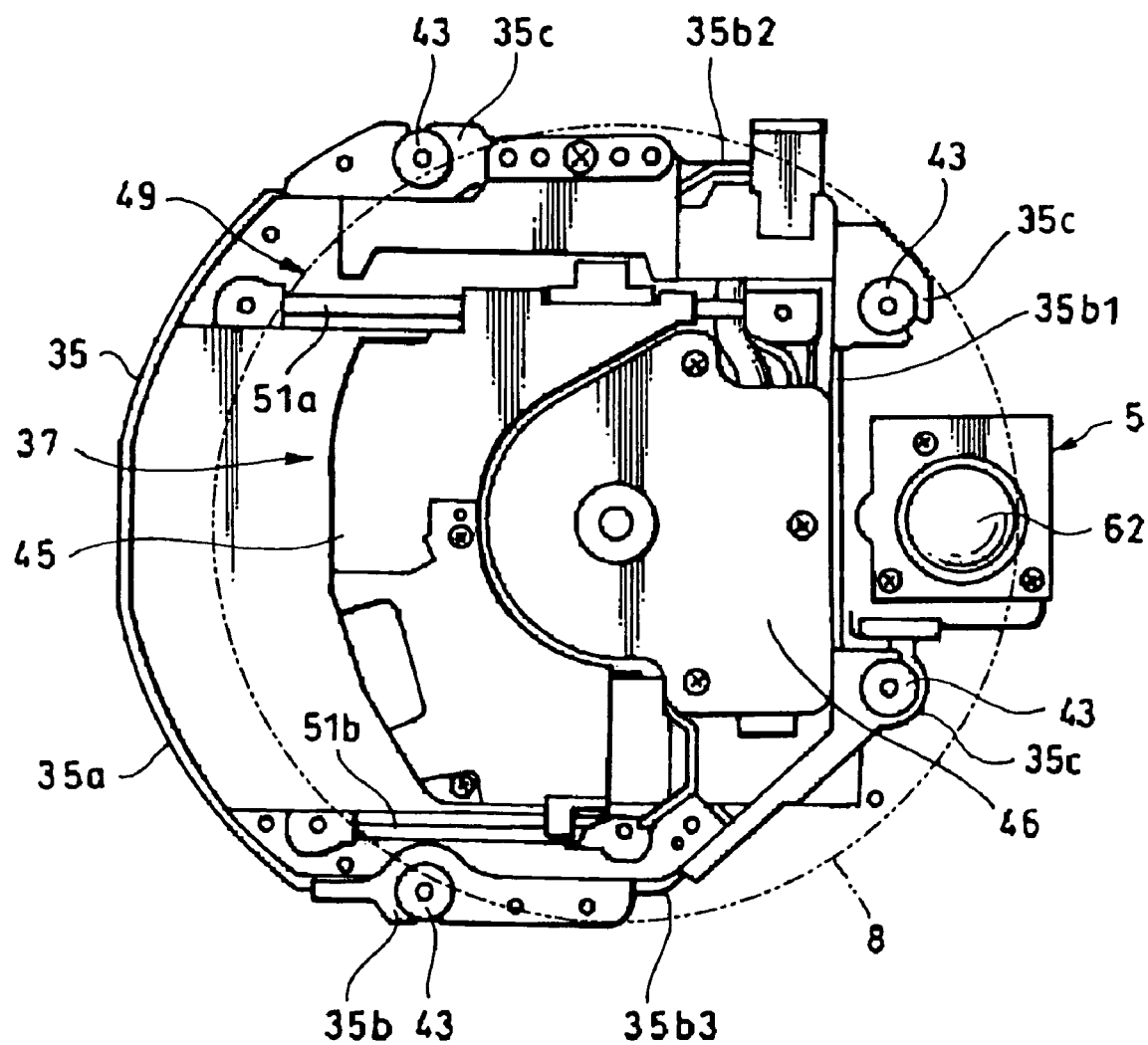
FIG. 14 is a bottom view of the disc drive apparatus according to the disc type camera apparatus shown in FIG. 1.
Figure 15:
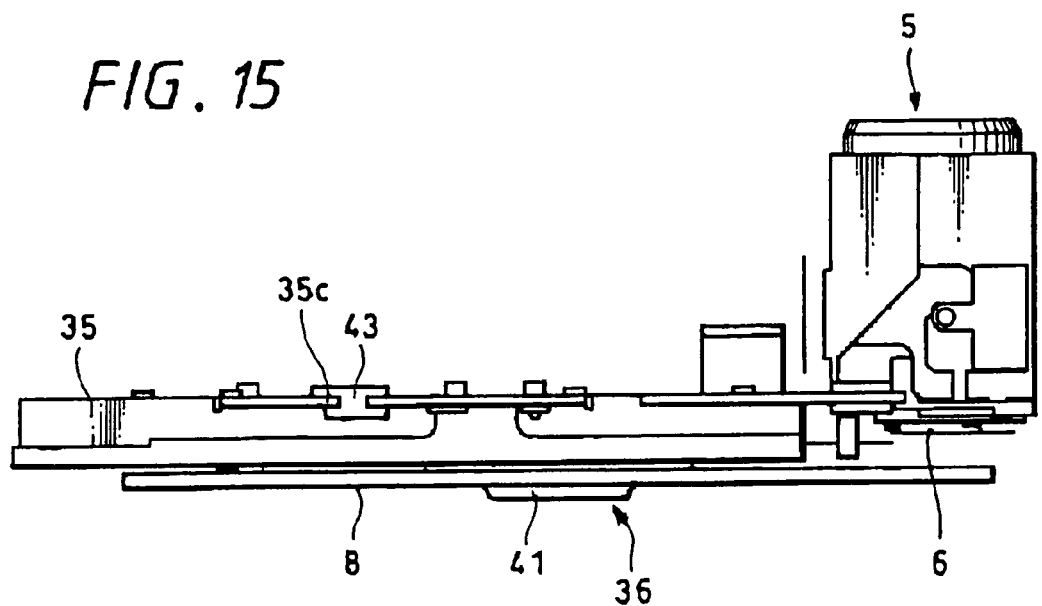
FIG. 15 is a side view of the disc drive apparatus according to the disc type camera apparatus shown in FIG. 1.
Figure 16:
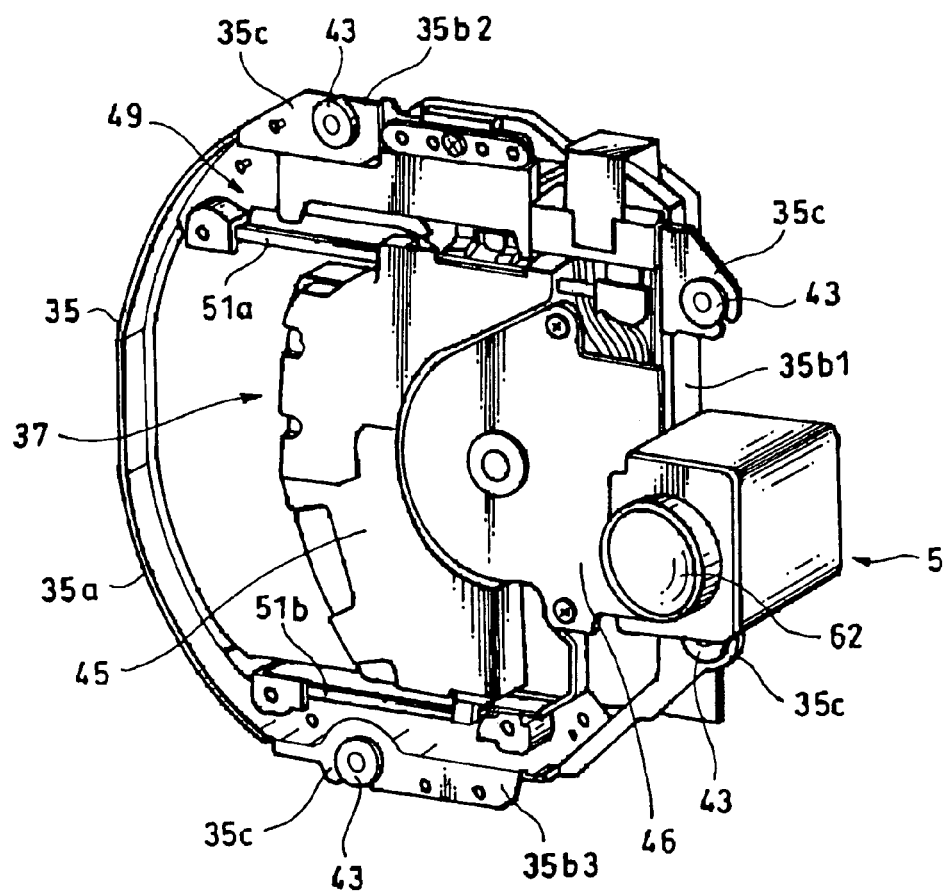
FIG. 16 is a perspective view showing the disc drive apparatus according to the disc type camera apparatus shown in FIG. 1 from the bottom surface side.
Figure 17:
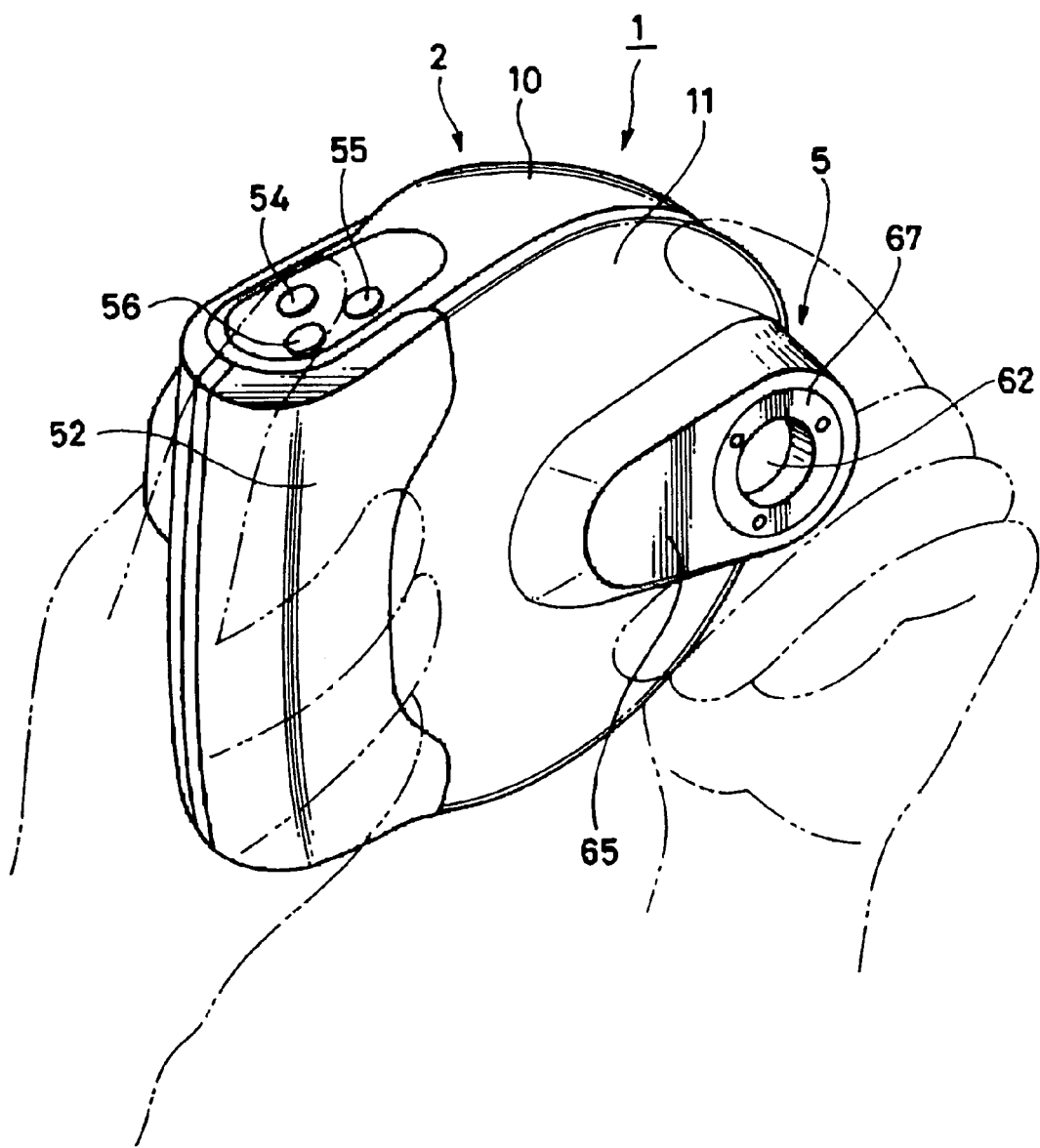
FIG. 17 is a perspective view used to explain the state in which the disc type camera apparatus shown in FIG. 1 is in use.
Figure 18:
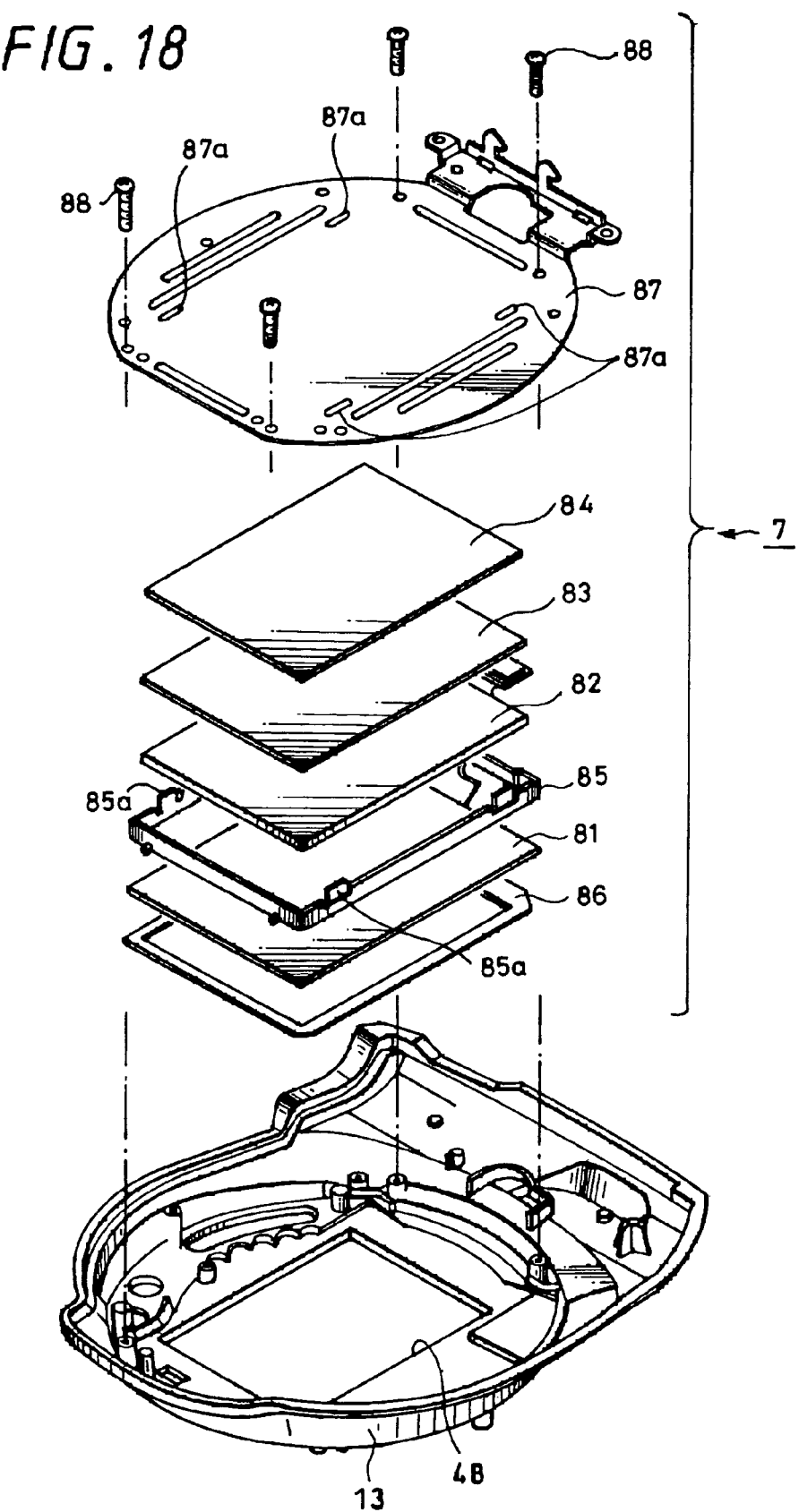
FIG. 18 is an exploded perspective view showing an embodiment of a touch panel apparatus according to the camera apparatus of the present invention.
Figure 19:
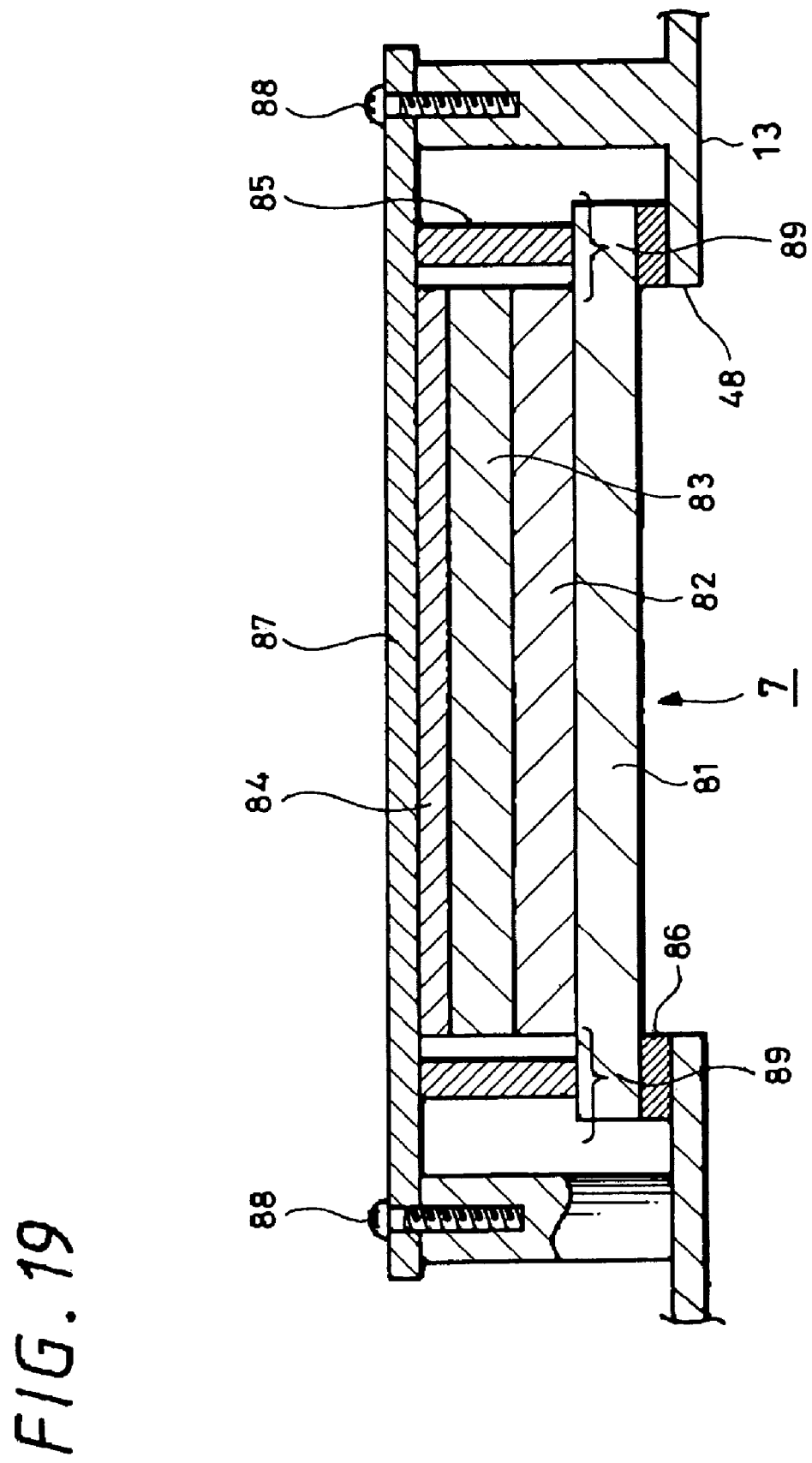
FIG. 19 is an explanatory diagram showing the embodiment of the touch panel apparatus according to the camera apparatus of the present invention in a cross-sectional fashion.
Figure 20:
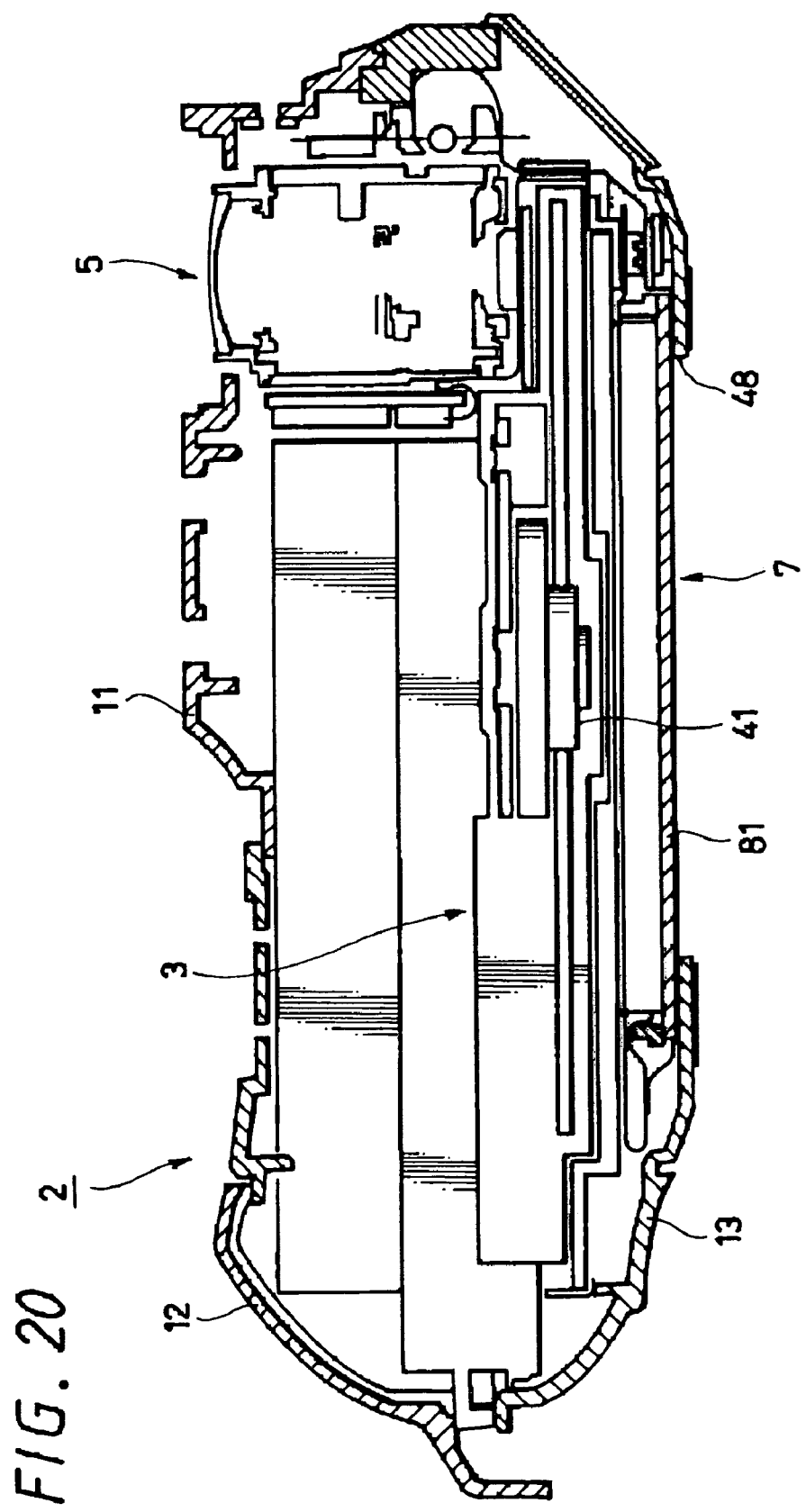
FIG. 20 is an explanatory diagram showing the disc type camera apparatus shown in FIG. 1 in a cross-sectional fashion.
Figure 21:
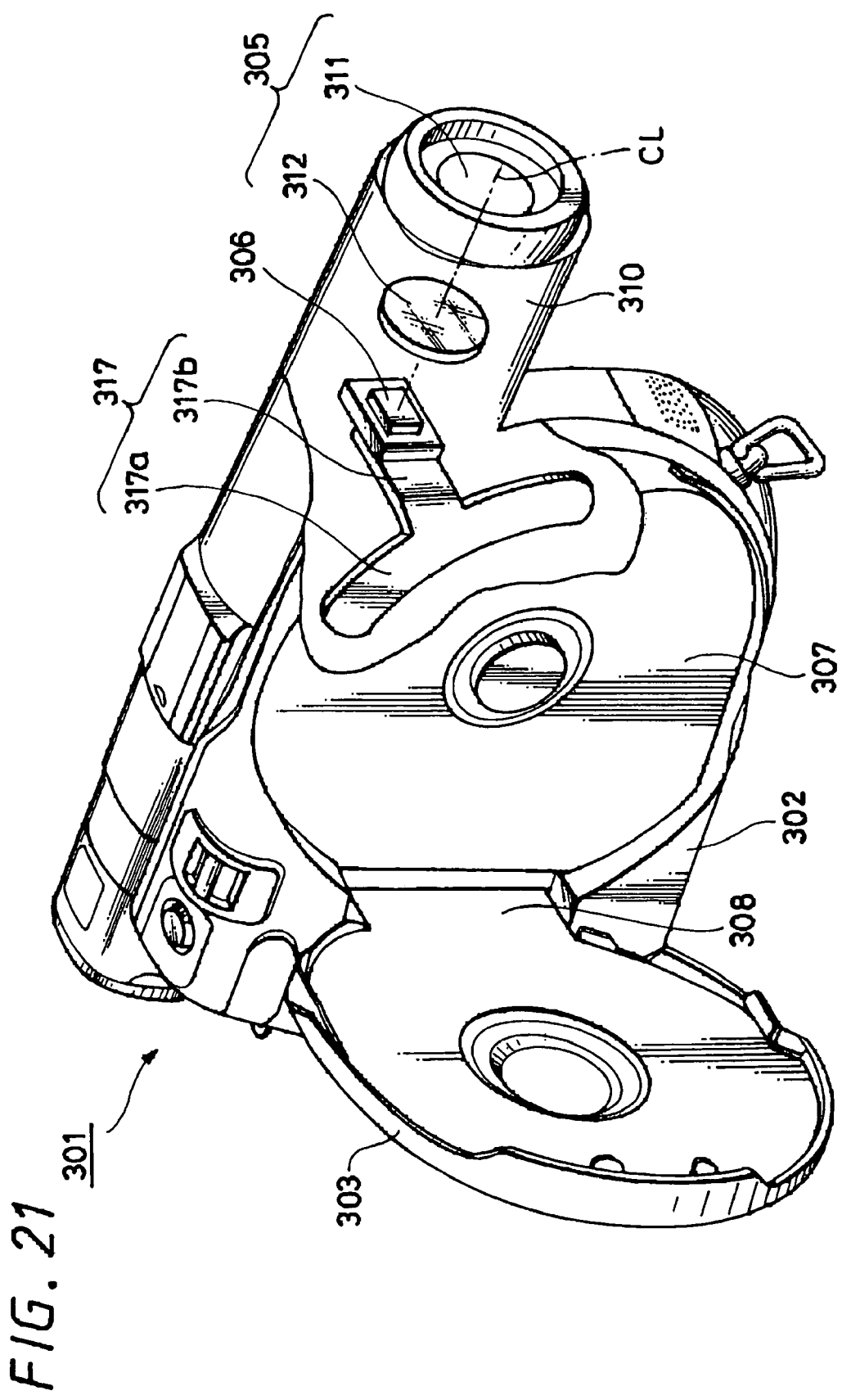
FIG. 21 is an explanatory diagram showing a part of a disc type camera apparatus according to a second embodiment of the present invention in a cross-sectional fashion.

FIGS. 1 to 21 show the embodiments of the present invention. Specifically, FIGS. 1 to 7 show a disc type camera apparatus of a camera apparatus according to a first embodiment of the present invention. That is, FIG. 1 is a front view of a disc type camera apparatus; FIG. 2 is a bottom view thereof; FIG. 3 is a plan view thereof; FIG. 4 is a rear view thereof; FIG. 5 is a left-hand side elevational view thereof; FIG. 6 is a right-hand side elevational view thereof; and FIG. 7 is a perspective view of an outside appearance. FIG. 8 is a perspective view showing a disc type camera apparatus according to the present invention from the front side with its buckle being opened; FIG. 9 is a perspective view showing the disc type camera apparatus according to the present invention from the disc lid side with its disc lid and buckle both being opened; FIG. 10 is a perspective view showing the disc type camera apparatus with the disc lid being opened; FIG. 11 is an exploded perspective view showing the disc type camera apparatus with the disc lid being opened; FIG. 12 is an explanatory diagram showing the central portion of the disc type camera apparatus in a cross-sectional fashion; FIG. 13 is an explanatory diagram showing the central portion of the disc type camera apparatus in a cross-sectional fashion with the disc lid being opened; FIG. 14 is a bottom view of a disc drive apparatus; FIG. 15 is a side view thereof; FIG. 16 is a perspective view thereof; FIG. 17 is an explanatory diagram showing the state in which the disc type camera apparatus is in use; FIG. 18 is an exploded perspective view used to explain a touch panel apparatus; FIG. 19 is a cross-sectional view of the touch panel apparatus; FIG. 20 is a cross-sectional view of the camera apparatus according to the present invention; and FIG. 21 is a partly-cross-sectional perspective view used to explain a main portion of a disc type camera apparatus of a camera apparatus according to a second embodiment of the present invention.

A camera apparatus 1 shown in FIGS. 1 to 11 is a camera apparatus (hereinafter referred to as a "disc type camera apparatus") which uses a DVD-R (Digital Video Disc-Recordable), which shows a specific example of a disc-like recording medium, as information storage media and converts an optical image into an electric signal by a CCD (charge-coupled device), that is, a solid-state image pickup device so that the thus converted electric signal may be recorded on a DVD-R or that the thus converted electric signal may be displayed on a display apparatus formed of a suitable flat surface monitor such as an LCD (liquid-crystal display). However, the information storage media according to the camera apparatus of the present invention is not limited to the DVD-R. As the information storage media, there can be used other recordable optical discs such as a DVD-RW (Digital Video Disc Rewritable), disc-like recording mediums of other recording systems such as a magneto-optical disc and a magnetic disc.

As shown in FIGS. 1 to 11, this disc type camera apparatus 1 is composed of a camera apparatus body 2 to which a plurality of openable and closable lid can be attached, a disc drive apparatus 3 for rotating a DVD-R, detachably attached thereto, to record (write) and reproduce (read) an information signal, a control apparatus (not shown) including a control circuit and the like to control driving of this disc drive apparatus 3, a lens apparatus 5 for introducing an image of an object into a CCD (solid-state image pickup device) serving as an image pickup means, a touch panel apparatus 7 including a display means for displaying a picture based on a video signal outputted from the CCD 6 and which serves also as an input means of command signals, a storage device (not shown) for temporarily storing therein a video signal outputted from the CCD 6 and the like. These disc drive apparatus 3, lens apparatus 5 and touch-panel apparatus 7 and the like are all housed within the camera apparatus body 2.

As shown in FIGS. 1 to 11, the camera apparatus body 2 is composed of a center frame body 10 located at the central portion, a lens-side outer case body 11 for covering one surface side of this center frame body 10 and a buckle 12 for covering an opening portion formed on this lens-side outer case body 11 so that the opening portion can be opened and closed. This center frame body 10 has a disc compartment portion formed at its side opposite to the lens-side outer case body 11 and a disc-like recording medium can be detachably accommodated into this disc compartment portion. The disc compartment portion is covered with a disc lid 13 which is rotatably attached to the center frame body 10 so that the disc compartment portion can be opened and closed.

The center frame body 10 has substantially a horseshoe-shaped flat surface and it is composed of a curved frame portion 16 of substantially U-like shape and a horizontal crosspiece portion 15 for joining the opening side of the curved frame portion 16 in substantially straight-line fashion. Although this center frame body 10 is high enough to house therein the disc drive apparatus 3 and the like, it is shaped so as to have an incline such that the side of the horizontal crosspiece portion 15 is set to be high and that the height of the curved frame portion 16 of the opposite side is progressively decreased in the center thereof. The disc drive apparatus 3, the control apparatus, other apparatus and devices are located within this center frame body 10. This center frame body 10 has the lens-side outer case body 11 secured on its surface opposite to the side of the disc lid 13 by a plurality of fixing screws.

The lens-side outer case body 11 has on its horizontal crosspiece portion 15 side formed an opening portion 17 and this opening portion 17 can be freely opened and closed by the buckle 12. The buckle 12 is rotatably supported by a pair of hinge arms 23, 23 rotatably supported to the center frame body 10.

Based on rotation operations of the pair of hinge arms 23, 23, the buckle 12 can stop at the closed position shown in FIG. 7 and the opened position shown in FIG. 8 or the buckle 12 can be stopped at arbitrary positions between the closed position and the opened position.

A sealing member 24 is attached to the whole periphery of the outer peripheral edge of the inner surface of the buckle 12. This sealing member 24 is adapted to maintain airtight property between the buckle 12 and the camera apparatus body 2 to thereby realize a waterproof (or water-resistant) structure in the inside of the buckle 12. The sealing member 24 may be formed as one body with the buckle 12 by a dichromatic molding, for example. Alternatively, a string-like sealing member may be unitarily fixed to the buckle 12 by an adhesive.

This buckle 12 has not only a function as a lid to open and close the opening portion 17 including the battery compartment portion 18 but also a function as a fastening means for strongly fastening the disc lid 13 to the closed position. To this end, a fastening means 29 having a roller 30 rotatably supported thereon is provided at substantially the central portion of the tip end side of the buckle 12. Concurrently therewith, an engagement protrusion 31 with which a roller 20 is detachably engaged is provided at substantially the central portion of the tip end side of the disc lid 13. By engaging the fastening means 29 into this engagement protrusion 31 through the roller 30, the disc lid 13 can be held at the position at which the disc lid 13 is strongly fastened and closed by the buckle 12.

This fastening operation and the opposite operation are applied to the fastening means 29 and the roller 30 is rotated in the direction in which the fastening means 29 is disengaged from the engagement protrusion 31 and thereby the engagement state is released, whereby the buckle 12 can be opened to open the opening portion 17. The battery compartment portion 18 and the three operation means are located within this opening portion 17 and the battery compartment portion 18 and the three operation means can be closed or opened by the buckle 12. The three operation means are a recording stop switch 21 serving as the first operation means for stopping the recording means from recording the disc-like recording medium, a slide lever 22 serving as the second operation means and a restart switch 27 for restarting the disc type camera apparatus 1 which was de-energized by some trouble.

Thus, when the buckle 12 is located at the closed position shown in FIG. 7, since the opening portion 17 is closed by the buckle 12, the battery compartment portion 18 and the three operation means are all hidden with the buckle 12. In addition, since the sealing member 24 provided at the outer peripheral edge of the inner surface of the buckle 12 is closely contacted with the whole periphery of the lens-side outer case body 11 in an airtight fashion, it is possible to prevent dusts and smudges from entering from the contact portion into the camera apparatus body 2 and also it is possible to reliably prevent liquid such as water and moisture from entering the camera apparatus body 2.

When on the other hand the buckle 12 is located at the opened position shown in FIG. 8, the battery compartment portion 18, the recording stop button 21, the slide lever 22 and the restart switch 27 are exposed, respectively. For this reason, in the state in which the buckle 12 is opened, a battery 28, which shows a specific example of the power supply, can be unloaded from the battery compartment portion 18 and a new battery 28 can be loaded into the battery compartment portion 18. Also, since the recording stop button 21, the slide lever 22 and the restart switch 27 can be operated only when the buckle 12 is placed in the opened position, it is possible to prevent the occurrence of troubles in which the user makes an error to operate the slide lever 22 before the buckle 12 is opened and in which the disc lid 13 is inadvertently opened before the buckle 12 is opened so that necessary information is not recorded on the information recording medium.

The battery compartment portion 18 is composed of a battery holder 19. The battery holder 19 is formed of a rectangular casing which is opened both in the top surface and the front surface. The battery holder 19 consists of a bottom surface portion, a back surface portion and left and right surface portions. The battery holder 19 has provided at its back surface portion 19 a terminal portion to which a body-side connection terminal connected to the terminal portion of the battery 28 is attached. Further, a switch holder 95 for holding the recording stop switch 21 is provided on the front portion of the left side surface portion of the battery holder 19. Also, a moisture sensor (moisture sensor device), not shown, is attached to the right side surface portion of the battery holder 19. This moisture sensor is adapted to detect moisture produced within the camera apparatus body 1. When this moisture sensor detects moisture from the inside of the camera apparatus body 2, operation of the disc drive apparatus 3 is stopped and writing of information may be inhibited.

As shown in FIGS. 9, 11 and 12, the disc drive apparatus 3 includes a mechanical deck 35, a disc rotating apparatus 36, which shows a specific example of a disc rotating means, an optical pickup apparatus 37, a pickup moving apparatus and the like. As shown in FIGS. 14 to 16, the mechanical deck 35 is formed of a frame member of substantially a D-like shape having substantially the same size as that of the DVD-R 8. This mechanical deck 35 is resiliently supported to the center frame body 10 through a plurality of mount members 43 (four mount members 43 in this embodiment). Specifically, the mechanical deck 35 is composed of an arc portion 35a shaped like an arc with a radius of curvature substantially the same as the radius of the DVD-R 8 and a U-like portion 35b having substantially U-like shape continuously formed from this arc portion 35a.

The U-like portion 35b of the mechanical deck 35 is composed of a chord portion 35b1 formed on the opposite side of the arc portion 35a in an opposing fashion and a pair of joint portions 35b2, 35b3 continued to both ends of this chord portion 35b1 and which are extended in the direction perpendicular to the direction in which the chord portion 35b1 is extended. Both ends of the arc portion 35a are continued from the respective ends of a pair of joint portions 35b2, 35b3. Mount receiving portion 35c to which mount members 43 made of rubber-like elastic members are detachably attached are provided both ends of the chord portion 35b in the longitudinal direction and respective end portions of the pair of joint portions 35b2, 35b3. The mechanical deck 35 is elastically supported to the center frame body 10 through the mount member 43 attached to these mount receiving portions 35c.

A motor base 46 is fixed to the mechanical deck 35 at its position displaced to one direction from the center thereof, that is, at substantially the central portion of the chord portion 35b1 of the mechanical deck 35 by screws. The disc rotating apparatus 36 is fixed to the motor base 46 by a suitable fixing means such as fixing screws. As shown in FIGS. 12 and 13, this disc rotating apparatus 36 is composed of a spindle motor 40 fixed to the motor base 46, a turntable 41 fixed to the rotary portion of this spindle motor 40 and the like.

As shown in FIG. 9, the turntable 41 is composed of a disc engagement portion 41a with which the central hole of the DVD-R 8 is fitted and a disc loading portion 41b on which the peripheral edge portion of the center hole is loaded. Further, the engagement portion 41a includes a plurality of clamp pawls 42 (three clamp pawls 42 in this embodiment) provided along the circumferential direction with an equal interval and these clamp pawls 42 are engaged with the peripheral edge portion of the center hole of the DVD-R 8 to thereby hold the DVD-R 8. The clamp pawls 42 are spring-biased in the outside of the radius direction by coil springs, respectively. The DVD-R 8 is centered at the center of the turntable 41 and held at constant holding force by holding force of the clamp pawls 42 under spring forces of the coil springs. By moving the clamp pawls 42 in the backward against the spring force of the coil spring, it becomes possible to load the DVD-R 8 onto the turntable 41 and to unload the DVD-R 8 from the turntable 41.

In the lateral direction of this disc rotating apparatus 36, the optical pickup apparatus 37, which shows a specific example of the recording means, is disposed within a space encircled by the arc portion 35a and the U-like portion 35b of the mechanical deck 35. The optical pickup apparatus 37 is composed of a biaxial actuator including a pickup lens 44 opposed to the information recording surface of the DVD-R 8, a slide member 45 having this biaxial actuator mounted thereon and the like. As shown in FIGS. 14 and 16, the slide member 45 can be freely reciprocated by the pickup moving apparatus 49 and it can become close to and come away from the disc rotating apparatus 36.

The pickup moving apparatus 49 is composed of two guide shafts 51a, 51b located parallel to each other, a feed screw shaft provided in parallel to these guide shafts 51a, 51b, a feed motor for rotating this feed screw shaft and the like. The two guide shafts 51a, 51b of the pickup moving apparatus 49 are extended in the front and back direction of the disc type camera apparatus 1 across the spindle motor 40. The slide member 45 is slidably held on the two guide shafts 51a, 51b and a nut member attached to the slide member 45 is engaged with the screw portion of the feed screw shaft. Thus, when the feed motor of the pickup moving apparatus 49 is rotated, the optical pickup apparatus 37 can be selectively moved in the direction in which it becomes close to the turntable 41 and in the direction in which it comes away from the turntable 41 in response to the rotating direction of the feed screw shaft.

The disc drive apparatus 3 having the above-mentioned arrangement is attached to the center frame body 10 in the state in which the turntable 41 is located on the side of the disc lid 13. The disc compartment portion 47 on which the disc-like recording medium such as the DVD-R 8 is detachably loaded is set on the side of the turntable 41 of this disc drive apparatus 3. This disc drive apparatus 3 divides the inside space of the camera apparatus body 2 into a first chamber 97 including the disc compartment portion 47 and a second chamber 98 including the opening portion 17 made openable and closable by the buckle 12 as shown in FIG. 12. The first and second chambers 97 and 98 may be communicated with each other by air holes bored on the battery holder 19, a clearance between the assemblies, a clearance between the apparatus and the like so that the air can be circulated between the first and second chambers 97 and 98.

Further, as shown in FIG. 12, a space portion for use with the lens apparatus is set at the outside of the U-like portion 35b serving as the portion without arc of the mechanical deck 35 which is the inner part of the disc drive apparatus 3 within the camera apparatus body 2 and the lens apparatus 5 is disposed within such space portion. The lens apparatus 5 includes a lens barrel 53 formed of a combination of a plurality of cylindrical bodies and a lens unit held on this lens barrel 53 and which is formed of a combination of a plurality of lenses containing a camera lens 62. The CCD 6, which shows a specific example of the image pickup means, is located behind an optical axis CL of the lens unit. The CCD 6 is fixed to the lens barrel 53 and the optical axis CL of the lens unit is located at substantially the central portion of its light-receiving surface.

As shown in FIGS. 1 and 7 and the like, the lens apparatus 5 is disposed at the end portion opposite to the buckle 12 of the lens-side outer case body 11 located at the front of the disc type camera apparatus 1 in the state in which the camera lens 62 is exposed to the front surface. In order to dispose this lens apparatus 5, the lens-side outer case body 11 is provided with a lens thick portion, not shown, protruded toward the front surface side and a lens cover 65 is attached to the lens thick portion. A lens waterproofing device including a lens protecting glass for protecting the camera lens 62 is provided in the concave portion formed on this lens thick portion.

The lens apparatus 5 has its camera lens 62 set on the side of the lens-side outer case body 11 opposite to the disc compartment portion 47 and it is located in such a manner that substantially the whole thereof may be located within the area (projection surface) projected on the plane of the DVD-R 8 loaded on the turntable 41. Further, the optical axis CL of the lens unit of the lens apparatus 5 is extended in the direction nearly perpendicular to the plane of the DVD-R 8, in other words, in the direction nearly parallel to the rotary shaft of the turntable 41 of the table rotating apparatus 36.

As shown in FIGS. 10 and 11, a panel 57 is provided on the disc compartment portion 47 so as to hide the lens apparatus 3 and an empty space formed around the disc drive apparatus 3. The panel 57 is formed of a flat plate member having a suitable shape such that it may hide the mechanical deck 35 at its portion without arc, that is, the remaining portion obtained by removing the D-like portion from the circle. This panel 57 is made of a metal material having excellent heat transmission property and large heat radiation effect, such as aluminum alloy, iron and copper. However, the panel 57 is not limited to the metal material and it is needless to say that the panel 57 may be formed of engineering plastic, composite material and various kinds of other material insofar as those materials are excellent in heat transmission property.

The panel 57 serving as the radiation plate is detachably attached to the center frame body 10 by a plurality of fixing screws, not shown. As shown in FIG. 12, the CCD 6 attached to the lens barrel 53 is opposed to the back surface of the panel 57 in the state in which they are extremely close to each other. As a result, most of heat generated from the CCD 6 may be transmitted to the panel 57 and heat may be radiated at the wide space portion, which is the disc compartment portion 47 within the camera apparatus body 2, and rise of temperature in the CCD 6 can be suppressed. At the same time, it is possible to prevent temperature around the CCD 6 from being raised locally.

While the panel 57 is located near the CCD 6 in this embodiment, the present invention is not limited thereto and the CCD 6 may be brought in direct contact with the CCD 6. In such a case, heat transmission efficiency of heat transmitted from the CCD 6 to the panel 57 can be improved and hence the rise of temperature in the CCD 6 can be suppressed more effectively. Also, a sheet member (for example, silicon rubber having heat transmission property and other rubber-like elastic members, etc.) having both of elasticity and heat transmission property may be sandwiched between the panel 57 and the CCD 6. In such a case, in addition to the effect for suppressing the rise of temperature in the CCD 6, urging external force given to the CCD 6 can be absorbed by the above sheet member and hence it is possible to prevent the CCD 6 from being warped due to such external force.

When light of object passed through the lens unit of the thus disposed lens apparatus 5 is received by the CCD 6, a video signal formed of an electric signal corresponding to the object is outputted from the CCD 6 to a suitable apparatus such as a control apparatus and a display apparatus. In order to cover the side of the camera lens 62 of this lens apparatus 5, as shown in FIG. 12, a lens cover 65 is attached to the lens thick portion 11a. The lens cover 65 is shaped so as to match with the lens thick portion 11a and an opening hole 78 is bored through both of the lens cover 65 and the lens thick portion 11a in order to expose the camera lens 62 of the lens barrel 54. The lens cover 65 is detachably attached to the lens-side outer case body 11 by a plurality of fixing screws. A fixing member 67 for fixing the lens protecting glass is detachably screwed into and attached to the opening hole 78 of the lens cover 65 as shown in FIG. 7 and the like.

As shown in FIGS. 4 and 9, a circularly-projected thick portion 13a is provided on the disc lid 13. This thick portion 13a is of the size corresponding to the size of a disc-like recording medium (for example, DVD-R having a diameter of 8 cm, etc.) loaded on the turntable 41. A rectangular opening window 48 is set substantially at the central portion of the thick portion 13a of this disc lid 13. A touch panel apparatus 7, which shows a specific example of a display apparatus, is attached to the opening window 48.

Also, a change-over switch 50 and the like are disposed on the lower portion of the touch panel apparatus 7 of the thick portion 13a of the disc lid 13. Further, a first finger hook portion 52a constructing a part of a grip portion 52 to grip the camera apparatus body 2 is provided on the upper right portion outside the thick portion 13a of the disc lid 13. A thumb of right hand is contacted with this first finger hook portion 52a.

The touch panel apparatus 7 is provided with a display means for displaying a recording signal or a reproduced signal as image information, an input means for carrying out various operations and the like. As shown in FIGS. 12 and 18, the touch panel apparatus 7 includes a touch panel 81, a display panel 82, a backlight panel 83, a cushion member 84, a holder 85, a sealing member 86, a pressing plate 87 and the like. The display panel 82 is bonded to one surface of the touch panel 81 by a suitable means such as adhesive and the backlight panel 83 is disposed on the other surface of the display panel 82. The display panel 82 and the backlight panel 83 are surrounded by the holder 85 formed of a rectangular frame body and this holder 85 is sandwiched by the touch panel 81 and the backlight panel 83, whereby the touch panel apparatus 7 forming one assembly body on the whole is constructed.

The display panel 82 is a display apparatus having an oblong rectangular flat plate-like shape. Although an LCD (liquid-crystal display) for changing the directions of liquid-crystal molecules with application of a voltage to amplify light transmittance to display image is used as the display panel 82 in this embodiment, an EL (electroluminescence) panel and other flat surface monitors can be used as the display panel 82. The touch panel 81 is closely contacted with the display surface of this display panel 82 and its display surface is exposed from the opening window 48.

The touch panel 81 is formed of an oblong rectangular plate member of which size is larger than the display panel 82 and it is an input apparatus having a function as an electric button. When the cameraman touches the display surface of the display panel 82 through this touch panel 81 with a suitable means such as fingers and exclusively-designed stylus, the sensor can sense this touching and the cameraman can carry out desired operations. A film-glass touch panel consisting of a film and glass, for example, is suitable for the application to the touch panel 81. However, the touch panel 81 is not limited to the film-glass touch panel and it is needless to say that not only a resistance film type touch panel such as a film-plastic touch panel and a glass-glass touch panel but also various kinds of touch panels such as an electrostatic capacity type touch panel and an ultrasonic type touch panel can be used as the touch panel 81.

The backlight panel 83 is formed as an oblong rectangular flat plate and it is a light source disposed at the back surface of the display panel 82. When the backlight panel 83 serving as the light source illuminates the back surface of the display panel 82, the cameraman is able to see image displayed on the display panel 82. Although an LED (light-emitting diode), for example, is suitable as the application to the light source of the backlight panel 83, the present invention is not limited thereto and EL (electroluminescence lamp), a CFL (cathode fluorescent lamp) and the like can be used as the light source of the backlight panel 83.

The cushion member 84 is formed of an oblong rectangular resilient member and it is a shock-absorbing member disposed at the rear surface of the backlight panel 83. Specifically, the cushion member 84 has a function to absorb loads applied to the display panel 82 and the backlight panel 83 when external force is applied to the touch panel 81 and the disc lid 13. Although rubber sponge, for example, can be used as the material of the cushion member 84, it is needless to say that various kinds of materials for use with this kind of cushion member can be used as the material of the cushion member 84.

As shown in FIG. 19, the holder 85 is a member for accommodating and holding the display panel 82, the backlight panel 83 an d the cushion member 84. This holder 85 is formed as an oblong rectangular frame body including an opening portion to expose the display area of the display panel 82. A plurality of engagement members 85a (four engagement members 85a in this embodiment) projecting toward the opening portion in the vertical direction is provided on one surface of both sides of the longitudinal direction of this holder 85. An ABS (acrylonitrile-butadiene-styrene) resin, for example, is suitable as the material of the holder 85. However, the material of the holder 85 is not limited to the ABS resin and it is needless to say that other engineering plastics can be applied to the material of the holder 85. Further, in addition to synthetic resins, metals such as aluminum alloy also can be used as the material of the holder 85.

Also, it is suitable that the holder 85 is formed of one frame body as shown in this embodiment but the shape of the holder 85 is not limited to one frame body. For example, one frame body may be divided into two frame bodies and the holder 85 may be composed of two U-like divided members. Also, one frame body may be divided into four frame bodies and the holder 85 may be composed of these four L-like or I-like divided members. Further, one frame body may be formed of a suitable combinations of these divided members.

The sealing member 76 is formed of a frame-like elastic member and it is held and fixed between the touch panel 81 and the peripheral edge portion of the opening window 48 of the disc lid 13. While the sealing member 76 may be made of silicon rubber, for example, the present invention is not limited thereto and it is needless to say that various kinds of materials for use with this kind of sealing member such as neoprene rubber and fluorine rubber can be used as the material of the sealing member 76.

The pressing plate 87 is able to press the cushion member 84 and the holder 85 at the same time and it is fastened to and fixed to the inside of the disc lid 13 by a plurality of fixing screws 88 (four fixing screws 88 in this embodiment). This pressing plate 87 is formed of a substantially circular thin plate and it has positioning holes 87a of the same number as that of engagement members 85a (four positioning holes 87a in this embodiment) formed at the position opposing the engagement members 85a of the holder 85. The pressing plate 87 may be suitably made of metal such as aluminum alloy and stainless steel. However, the material of the pressing plate 87 is not limited to the plate made of metal and it is needless to say that materials other than metals, such as engineering plastic can be used as the material of the pressing plate 87.

The touch panel apparatus 7 having the above-mentioned arrangement can be assembled with ease as follows, for example (see FIG. 12). First, the display surface of the display panel 82 is closely contacted with substantially the central portion of the touch panel 81 of the shape larger than that of the display panel 82. Then, a frame-like projected portion 89 is formed around the display panel 82 and the touch panel 81 is fixed to the display surface of the display panel 82 by adhesive. As a result, the display panel 82 and the touch panel 81 are joined together by adhesive and can be handled as one assembly body, which can simplify the assembly work. In addition, a risk in which a positional displacement between the display panel 82 and the touch panel 81 will occur can be removed by the adhesive and it is possible to prevent dusts and smudges from entering the clearance between the display panel 82 and the touch panel 81.

Next, the sealing member 86 is located at the inner peripheral edge of the opening window 48 of the disc lid 13. Subsequently, the assembly body in which the above-mentioned display panel 82 and touch panel 81 are laminated with each other is located in such a manner that the touch panel 81 of the assembly body may be opposed to the sealing member 86. As a consequence, the sealing member 86 is sandwiched between the touch panel 81 and the surrounding of the opening window 48 of the disc lid 13. Then, when suitable pressure is applied to the sealing member 86 with application of suitable force to the touch panel 81, the sealing member 86 can be closely attached to the touch panel 81 and the disc lid 13 and thereby airtight property can be maintained. As a result, it is possible to obtain high reliability for waterproof property and water-resistant property.

Thereafter, the holder 85 is located at the projected portion 89 of the touch panel 81 formed on the outside of the display panel 82. At that time, the surface in which the holder 85 comes in contact with the projected portion 89 is the surface of the opposite side of the surface in which the engagement members 85a are provided. Thus, the display panel 82 is accommodated within the frame of the holder 85. Subsequently, the backlight panel 83 and the cushion member 84 are located at the back surface of the display panel 82, in that order, and they are housed within the frame of the holder 85 similarly to the display panel 82.

Next, a plurality of engagement members 85a of the holder 85 is fitted into a plurality of positioning holes 87a of the pressing plate 87, whereby the pressing plate 87 is properly positioned in the horizontal direction. Finally, the cushion member 84 and the holder 85 are pressed simultaneously by the pressing plate 87 and the pressing plate 87 is fastened to and fixed to the inside of the disc lid 13 by a plurality of fixing screws 88. Thus, the pressing plate 87 can be properly positioned in the height direction, whereby the touch panel 81 is pressed by the holder 85 pressed by the pressing plate 87 and thereby the touch panel 81 can be fixed to the disc lid 13 strongly.

On the other hand, the display panel 82 and the backlight panel 83 housed within the holder 85 are fixed with elasticity through the cushion member 84. At that time, since not only the touch panel 81 and the display panel 82 are closely contacted with each other but also the backlight panel 83 and the cushion member 84 also are laminated close to each other, it is possible to decrease the thickness of the touch panel apparatus 7. In consequence, after all assembly processes were completed, the touch panel apparatus 7 is attached to the inside of the disc lid 13.

FIG. 20 is a cross-sectional view showing layout and arrangement of the touch panel apparatus 7 from the whole of the disc type camera apparatus 1. The camera apparatus body 2 has the disc drive apparatus 13 located so as to partition the inside space surrounded by the lens-side outer case body 11 and the disc lid 13. This disc drive apparatus 3 has the lens apparatus 5 located on its side opposite to the buckle 12. Then, the disc lid 13 including the touch panel apparatus 7 is opposed so as to surround the disc loading portion 47 on the side of the turntable 41 mounted on the disc drive apparatus 3.

When the cameraman touches the surface, serving as the operation surface, of the touch panel 8 with a suitable means such as the fingers and the exclusively-designed stylus, the touch panel apparatus 7 which has been assembled and attached to the camera apparatus body 2 in this manner can be operated as a switch and the like so that the cameraman can switch display and select modes.

During the cameraman touches the touch panel apparatus 7, even when large force is applied to the touch panel 81, since such large force is transmitted from the touch panel 81 through the holder 85 to the pressing plate 87, the display panel 82 and the backlight panel 83 housed within the holder 85 can be protected from large load. Also, even when external force which is strong enough to affect the display panel 82 and the backlight panel 83 is applied to the touch panel 81, such external force can be absorbed by the cushion member 84 and hence influences imposed on the display panel 82 and the backlight panel 83 can be alleviated or removed.

The touch panel apparatus according to the related art has encountered with the following problems with respect to these points. That is, the related-art touch panel apparatus has a structure in which external force is transmitted to the display panel and load is therefore applied to the display panel when external force is applied to the touch panel. As a result, it is unavoidable that glass, which is weak in strength, of the display panel is easily broken. Also, there is a problem in which a suitable means such as a spacer disposed to alleviate the influence of external force will hinder the touch panel apparatus from being reduced in thickness.

On the other hand, as shown by the touch panel apparatus 7 according to this embodiment, in the touch panel apparatus 7 includes the disc lid (housing) 13 having the opening portion 48 formed thereon, the touch panel 81 attached to the disc lid 13 so as to close the opening portion 48, the display panel 82 located at the rear surface of the touch panel 81, the backlight panel 83 located at the rear surface of the display panel 82 and the pressing plate 87 located at the back surface of the backlight panel 83, since the touch panel 81 is formed to be larger than the display panel 82, the holder 85 is interposed between the projected portion 89 of the touch panel 81 projected from this display panel 82 and the pressing plate 87 wherein the display panel 81 and the backlight panel 83 are sandwiched between the touch panel 81 and the pressing plate 87 through the holder 85, the above-mentioned problems can be solved.

Also, in the touch panel apparatus 7, the holder 85 may be formed of a continuing frame member that can cover the whole surrounding of the display panel 82.

Further, in the touch panel apparatus 7, the cushion member 84 may be disposed at the back surface of the display panel 82 or the backlight panel 83.

Then, the touch panel apparatus 7 may have an airtight arrangement obtained by interposing the sealing member 86 between the disc lid (housing) 13 and the touch panel 81.

Further, in the touch panel apparatus 7, it is preferable that the touch panel 81 and the display panel 82 should be closely bonded together.

Since the touch panel apparatus 7 has the arrangement in which the touch panel 81 is formed to be larger than the display panel 82, the holder 85 is interposed between the projected portion 89 of the touch panel 81 projected from the display panel 82 and the pressing plate 87 and the display panel 82 and the backlight panel 83 are sandwiched between the touch panel 81 and the pressing plate 87 through this holder 85, in the state in which the display panel 82 and the backlight panel 83 are housed within the holder 85, the touch panel 81 can be fixed to the disc lid 13. Thus, when external force is applied to the touch panel 81, the external force is transmitted from the touch panel 81 to the holder 85. Therefore, since the display panel 82 and the backlight panel 83 housed within the holder 85 can be prevented from being applied with the load by the external force applied to the touch panel 81, it is possible to make the glass of the display panel 81 become difficult to break.

Also, according to the touch panel apparatus of this embodiment, the holder 85 is composed of the continuing frame body which thoroughly surrounds the circumference of the display panel 82, whereby the whole periphery of the touch panel 82 can be uniformly fastened with force of substantially the same. In addition, since the assembly work of the touch panel apparatus 7 becomes easy, the assembly process can be simplified and productivity can be improved.

Further, according to the touch panel apparatus 7 of this embodiment, since the cushion member 84 is located at the back surface of the display panel 82 or the backlight panel 83, the load applied to the display panel 82 and the backlight panel 83 based on the external force applied to the touch panel 81 can be absorbed by the cushion member 84. Therefore, the glass of the display panel 82 can be made difficult to break and it is possible to reduce the amount in which image is distorted when the load is applied to the display panel 81. Also, when the central portion of the touch panel 81 is pressed, although the display panel 82 is pressed by deformation of the touch panel 81, since the cushion member 84 is dented to reduce pressure applied to the display panel 82, it is possible to make the glass of the display panel 82 become difficult to break.

Further, according to the touch apparatus 7 of this embodiment, since the sealing member 86 is interposed between the disc lid (housing) 13 and the touch panel 81, it is possible to prevent water or moisture from entering the inside of the disc lid 13. Therefore, the waterproof function or water-resistant function of the touch panel apparatus 7 can be improved and hence it becomes possible to use the camera apparatus in the rain or water.

Also, according to the touch panel apparatus 7 of this embodiment, it is possible to reduce the thickness of the touch panel apparatus 7 by closely bonding the touch panel 81 and the display panel 82, which can contribute to reduction of the thickness of the camera apparatus such as the disc type camera apparatus 1 and other electronic device. In addition, the positional displacement between the touch panel 81 and the display panel 82 can be prevented and dusts and smudges can be prevented from entering the space between the touch panel 81 and the display panel 82, thereby making it possible to suppress the occurrence rate of yield. Further, since the touch panel 81 and the display panel 82 can be handled as one assembly body after the touch panel 81 and the display panel 82 were bonded to each other, the assembly process can be simplified and the productivity can be improved.

Since the external force applied to the touch panel 81 can be prevented from being transmitted to the display panel 82 or the above external force is made difficult to be transmitted to the display panel 82, it is possible to make the glass of the display panel 82 become difficult to break. Further, it is possible to realize the thin touch panel apparatus 7 which is highly reliable in waterproof or water-resistant function and which can be assembled with ease by a simple structure.

Specifically, it is possible to improve shock resistance, waterproof (water-resistant) property and the like by using the above-mentioned touch panel apparatus 7.

The disc lid 13 is rotatably supported to the center frame body 10 by a hinge mechanism 69. A change-over switch 50 for turning the power supply ON and OFF and the like are disposed on the lower portion of the touch panel apparatus 7 of the thick portion 13a of the disc lid 13. The first finger hook portion 52a constructing a part of the grip portion 52 to grip the camera apparatus body 2 is provided on the upper right portion outside the thick portion 13a of this disc lid 13. A thumb of right hand is brought in contact with the first finger hook portion 52a.

The change-over switch 50 is a switch for turning the power supply ON and OFF. This change-over switch 50 can be slid in an arc fashion and it can be depressed at predetermined positions. Specifically, when the change-over switch 50 is slid, the power supply can be turned ON and OFF. Also, when the change-over switch 50 is depressed at the position in which the power supply is turned ON, shooting modes (for example, still picture shooting, motion shooting, playback display, etc.) can be switched.

As shown in FIGS. 3 and 9, a recording button 54 for starting and ending shooting and a pair of zoom buttons are located at one end portion of the side of the horizontal crosspiece portion 15 in the curved frame portion 16 of the center frame body 10. The pair of zoom buttons is composed of a wide angle button 55 for moving the lens apparatus 5 to the wide angle (wide angle) side and a telephoto button 56 for moving the lens apparatus 5 to the telephoto (telephoto) side. When the wide angle button 55 or the telephoto button 56 is being continuously pressed within a predetermined range, a picture may be continuously enlarged or reduced. When the wide angle button 55 or the telephoto button 56 is placed at the end, the movement of the lens apparatus 5 to the wide angle side or the telephoto side is stopped.

As shown in FIGS. 2 and 7, a tripod fixing metal fittings 58 for attaching this disc type camera apparatus 1 to a tripod (not shown) is buried into the other end portion of the side of the horizontal crosspiece portion 15 in the curved frame portion 16 of the center frame body 10. The tripod fixing metal fittings 58 can be detachably attached to the other end portion of the side of the crosspiece portion 15 by a plurality of fixing screws 59. The tripod fixing metal fittings 58 is formed of substantially an elliptic member with different radiuses of curvature of arc portions at both ends in the longitudinal direction and a screw hole 58a to which a tripod fixing screw is fitted is formed on the large-diameter side.

FIG. 17 is a perspective view showing an example of the state in which the disc type camera apparatus 1 according to this embodiment is in use. The cameraman holds the grip portion 52 of the camera apparatus body 2 with right hand and grips the portion near the lens apparatus 5 of the camera apparatus body 2 with left hand. Accordingly, as shown in FIGS. 1 to 3, a second finger hook portion 52b constructing a part of the grip portion 52 of the camera apparatus body 2 is provided at the end portion of the opposite side of the lens apparatus 5 of the lens-side outer case body 11.

The middle finger and the third finger of the right hand are contacted with the second finger hook portion 52b of the grip portion 52 of the disc type waterproof camera apparatus 1. The cameraman grips the grip portion 52 with the middle finger of the right hand and the like hooked to this second finger hook portion 52b and the thumb of the right hand hooked to the first finger hook portion 52a. Then, the cameraman turns the index finger of the right hand around above the camera apparatus body 2 to operate the three operation buttons 54 to 56 of the recording button 54, the wide angle button 55 and the telephoto button 56. In this manner, the cameraman can hold the disc type camera apparatus 1 and can take a picture of a desired object with a desired composition, a size and the like after the cameraman has operated the three operation buttons 54 to 56 with the index finger.

According to the disc type camera apparatus 1 having the above-mentioned arrangement, since the mechanical deck 35 of the disc drive apparatus 3 is formed as substantially the D-like shape to form a space under the disc-like recording medium and the camera unit is located within the above space in such a manner that the optical axis of the lens thereof may be extended in the direction substantially parallel to the direction nearly perpendicular to the plane of the disc (axial direction of the rotary shaft of the disc rotating means), the whole of the disc type camera apparatus 1 can be made compact in size and thin in thickness and hence a video camera which might be called a "disc-size video camera" can be realized. Also, since the U-like portion formed at the outside of the mechanical deck 35 is surrounded by the panel 57 and the panel 57 is formed of the radiation plate having excellent heat transmission property, heat can be effectively radiated from the CCD 6. As a result, rise of temperature in the CCD 6 and in the assemblies existing around the CCD 6 can be controlled and satisfactory shooting operations can be carried out. At the same time, the inside of the disc type camera apparatus 1 can be inconspicuous and hence visual effects of the disc type camera apparatus 1 can be improved.

INVENTIVE EXAMPLE 2

FIG. 21 is a partly-cross-sectional perspective view showing a disc type camera apparatus according to a second embodiment of the present invention. As shown in FIG. 21, a disc type camera apparatus 301 according to this embodiment includes a camera apparatus body 302 formed of a housing extended in the front and back direction. The camera apparatus body 302 has a lens apparatus 305 provided on the upper portion of the front thereof.

A disc compartment portion 307 is set on one side surface of the camera apparatus body 302 and the disc compartment portion 307 can be opened and closed by a disc lid 303. The disc lid 303 is rotatably supported by a hinge mechanism 308 provided at the rear portion of the camera apparatus body 301, whereby the disc lid 303 can be rotated in the lateral direction at the hinge mechanism 308. Thus, the disc lid 303 is constructed as a so-called front opening type lid.

The lens apparatus 305 is composed of a combination of a camera lens 311 opposed to the object and a lens group 312 consisting of a plurality of lenses located behind the camera lens 311. These lens apparatus 305 and CCD 306 are housed within a lens housing portion 310 projected forward from the front surface of the camera apparatus body 302. Then, an optical axis CL of the lens unit is made coincident with substantially the central portion of the light-receiving surface of the CCD 306.

A radiation plate 317 is located behind the CCD 306. The radiation plate 317 is composed of a radiation portion 317a developed in the disc compartment portion 307 and a heat transmission portion 317b located at the back surface of the CCD 306. These radiation portion 317a and heat transmission portion 317b are made of a material having excellent heat transmission property to transmit heat effectively and the radiation portion 317a and the heat transmission portion 317b are formed as one body. The heat transmission portion 317b of the radiation plate 317 may be brought in contact with the back surface of the CCD 306 or the heat transmission portion 317b of the radiation plate 317 may be opposed to the back surface of the CCD 306 with a proper clearance. The radiation portion 317a of the radiation plate 317 may be so shaped as to enter the space portion of the disc compartment portion 307 (arc-like radiation portion in this embodiment). Heat radiated from the CCD 306 is transmitted from the heat transmission portion 317b to the radiation plate 317 and thereby radiated from the radiation portion 317a to the disc compartment portion 307.

A rest of the arrangement of the disc type camera apparatus 301 is similar to that of the disc type camera apparatus 1 according to the first embodiment of the present invention. The disc type camera apparatus including the radiation plate 317 having the above-mentioned arrangement and the like can achieve effects similar to those of the above-described first embodiment.

While the present invention has been described so far, the present invention is not limited to the above-described embodiments and the following variants are also possible. For example, while the lens apparatus 5 is fixed to the camera apparatus body 2 as described hereinbefore by way of example, the present invention is not limited thereto and it is needless to say that the present invention can be applied to a camera apparatus in which the lens apparatus 5 can be constructed so as to become rotatable relative to the camera apparatus body 2 so that shooting angles may be varied. Also, the mechanical deck may be shaped in accordance with the shape of a block required by the camera apparatus so that the mechanical deck may be substantially housed within the projection surface of the disc-like recording medium.

Also, according to the touch panel apparatus 7 of the camera apparatus of the present invention, even when external force, which is larger than is necessary, is applied to the touch panel 81, force transmitted to the display panel 82 can be alleviated and thereby the display panel 82 can be protected from being affected. Accordingly, distortion of the image on the display screen can be decreased and hence it is possible to realize the touch panel apparatus 7 in which the glass of the display panel 82 is difficult to break. Further, the touch panel 81 is urged against the circumference of the opening window 48 bypassing the display panel 82 and the like, whereby pressure of proper strength can be applied to the sealing member 86. Then, when the touch panel 81 and the peripheral edge portion of the opening window 48 of the disc lid 13 are closely contacted with each other by the sealing member 86, airtight property of the joint portion can be maintained. Thus, it is possible to realize the touch panel apparatus 7 which is highly reliable in waterproof or water-resistant function.

Furthermore, since the display panel 82 and the touch panel 81 are closely contacted with each other by bonding, the assembly work of the touch panel apparatus 7 can be simplified and a positional displacement between the display panel 82 and the touch panel 81 can be prevented and dusts and smudges can be prevented from entering the space between the display panel 82 and the touch panel 81. Also, since the touch panel 81, the display panel 82, the backlight panel 83, the cushion member 84 and the like are closely laminated in an opposing fashion, it is possible to realize the thin touch panel apparatus 7. Accordingly, it is possible to realize the touch panel apparatus 7 which is suitable for use with miniaturized electronic devices.

Furthermore, the present invention can be applied to other camera apparatus than the disc type camera apparatus such as electronic still cameras, video cameras, personal computers with camera functions, mobile phones with camera functions, PHS (personal handyphone system) with camera functions and various kinds of camera apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A camera apparatus comprising:
   a disc compartment portion into and from which a disc-like recording medium is loaded and unloaded;
   disc rotating means provided within said disc compartment portion and rotating said disc-like recording medium detachably loaded thereon;
   a lens apparatus for passing light from an object; an image pickup device for forming an image from light supplied thereto from said lens apparatus and outputting an image signal corresponding to said image;
   recording means capable of recording image information on said disc-like recording medium based on the image signal outputted from said image pickup device; and
   a radiation plate provided within said disc compartment portion,
   wherein said radiation plate and said image pickup device are constructed so as to transmit heat therebetween so that heat is transmitted from said image pickup device through said radiation plate to said disc compartment portion,
   wherein said disc compartment portion has located therein a mechanical deck to which said disc rotating means is attached, said mechanical deck is formed as substantially a D-like shape and said mechanical deck has located at its portion without an arc said lens apparatus in such a manner that an optical axis of a lens thereof is extended in the direction substantially parallel to the axial direction of a rotary shaft of said disc rotating means, and
   wherein said disc-like recording medium loaded onto said disc rotating means has inside structures located within a projection surface.

2. A camera apparatus according to claim 1, wherein said disc compartment portion has located therein a panel which covers said mechanical deck at its portion without an arc, said panel being the radiation plate with excellent heat transmission property.

3. A camera apparatus according to claim 2, wherein said radiation plate is located close to or in contact with said image pickup device.

4. A camera apparatus according to claim 2, wherein said radiation plate and said image pickup device have a sheet member having elasticity and heat transmission property interposed therebetween.

5. A camera apparatus according to claim 1, further comprising a camera apparatus body having said disc rotating means, said lens apparatus and said recording means housed therein, said mechanical deck being located so as to divide the inside of said camera apparatus body into two chambers.

* * * * *